US011586337B2

(12) United States Patent
Tran

(10) Patent No.: US 11,586,337 B2
(45) Date of Patent: Feb. 21, 2023

(54) SYSTEM AND METHOD FOR USING PORTAL SYSTEMS IN AUGMENTED REALITY VIRTUAL ENVIRONMENTS

(71) Applicant: PEER INC, Bellevue, WA (US)

(72) Inventor: Thinh Tran, Bellevue, WA (US)

(73) Assignee: PEER INC, Bellevue, WA (US)

( * ) Notice: Subject to any disclaimer, the term of this patent is extended or adjusted under 35 U.S.C. 154(b) by 0 days.

(21) Appl. No.: 17/751,477

(22) Filed: May 23, 2022

(65) Prior Publication Data

US 2022/0382435 A1 Dec. 1, 2022

Related U.S. Application Data

(60) Provisional application No. 63/194,080, filed on May 27, 2021.

(51) Int. Cl.
| | |
|---|---|
| *G06F 3/04815* | (2022.01) |
| *H04W 12/065* | (2021.01) |
| *G06T 19/00* | (2011.01) |
| *H04W 4/029* | (2018.01) |

(52) U.S. Cl.
CPC ........ *G06F 3/04815* (2013.01); *G06T 19/006* (2013.01); *H04W 12/065* (2021.01); *H04W 4/029* (2018.02)

(58) Field of Classification Search
CPC .................................................. G06F 3/04815
See application file for complete search history.

(56) References Cited

U.S. PATENT DOCUMENTS

| | | | |
|---|---|---|---|
| 9,749,367 B1 * | 8/2017 | Kirby | G06Q 10/101 |
| 10,747,414 B2 | 8/2020 | Tran | |
| 2012/0249741 A1 * | 10/2012 | Maciocci | G06T 19/006 |
| | | | 348/51 |
| 2017/0228931 A1 * | 8/2017 | Parker | G06F 3/012 |
| 2019/0005717 A1 * | 1/2019 | Singh | G06T 15/80 |
| 2020/0302510 A1 * | 9/2020 | Chachek | G06V 20/52 |

FOREIGN PATENT DOCUMENTS

WO     WO-2021080589 A1 *   4/2021   ............. G01C 21/20

* cited by examiner

*Primary Examiner* — Roland J Casillas
(74) *Attorney, Agent, or Firm* — Seed Intellectual Property Law Group LLP

(57) ABSTRACT

An orthogonal or multi-dimensional fabric user interface is described herein. A remote server executes an operating system that provides a multi-dimensional fabric user interface for storing content for a particular user. The user can access select content by manipulating the multi-dimensional fabric user interface through a graphical user interface displayed on a personal mobile computing device. In this way, the user experiences and manipulates various data dimensions around the specific content they are accessing, rather than selecting a particular file structure location. The remote server also enables the user to enter a first location side of a portal and travel to a virtual representation a second actual physical location in the multi-dimensional fabric user interface from a virtual representation of a first actual physical location in the multi-dimensional fabric user interface.

24 Claims, 17 Drawing Sheets

SYSTEM AND METHOD FOR USING PORTAL SYSTEMS IN AUGMENTED REALITY VIRTUAL ENVIRONMENTS

TECHNICAL FIELD

The present application pertains to augmented reality virtual environments, and more particularly, to augmented reality virtual environments that contain portals that are accessible to users.

BACKGROUND

Description of the Related Art

Operating systems have changed little over the past few decades. Early operating systems were command driven, where a user specified a particular file location to access data. These operating systems morphed into the icon-based interfaces used today. Icon-based operating systems display graphical representations, or icons, of files or data. Icons are associated with a particular file location, such that interaction with an icon by a user results in the corresponding file location being accessed. Accordingly, historical operating systems have been structured around using the file's location within the memory to access data, which limits the flexibility of using alternative storage structures.

Additionally, there is a continuing desire to virtually visit actual physical locations that exist in the real world for a variety of purposes. This may be as basic as using a mapping software application. However, traditional mapping software is very limited in the information that is conveys and the user experience that it provides.

Furthermore, there is a continuing desire to improve methods of travel between virtual locations in an augmented reality virtual environments. The present disclosure address this and other needs.

BRIEF SUMMARY

Briefly stated, embodiments of the present disclosure are directed towards augmented reality system for enabling enhanced functionality in a virtual environment using a multi-dimensional fabric that stores content to be viewed within the virtual environment by a user. The multi-dimensional fabric stores content using time and location coordinates, which can be accessed in the virtual environment. The augmented reality system enables the user to create a portal in the virtual representation of the first actual physical location that facilitates travel to a virtual representation of a second actual physical location in the multi-dimensional fabric user interface.

In some embodiments, the system comprises a personal mobile computing device that stores authentication information, a display device, and a remote server. The display device includes a device memory that stores device computer instructions and a device processor that when executing the device computer instructions causes the display device to: determine when the personal mobile computing device is within range of the display device; coordinate authentication between the personal mobile computing device and a remote server; display a multi-dimensional fabric user interface in an Augmented Reality virtual environment that represents a first actual physical location to the user of the personal mobile computing device based on valid authentication of the personal mobile computing device; and receive input from the user.

The remote server includes a server memory that stores server computer instructions and a server processor that when executing the server computer instructions causes the remote server to: select the multi-dimensional fabric user interface that is specific for the user based on the valid authentication of the personal mobile computing device; provide the multi-dimensional fabric user interface to the display device; manipulate the multi-dimensional fabric user interface based on received input from the user via their associated plurality of personal mobile computing devices; provide the manipulated multi-dimensional fabric user interface to the display device to be displayed to the user; enable the user to create a portal in the virtual representation of the first actual physical location that facilitates travel to a virtual representation of a second actual physical location in the multi-dimensional fabric user interface, the portal having a first location side and a second location side; enable the user to enter the first location side of the portal and travel to the virtual representation the second actual physical location in the multi-dimensional fabric user interface from the virtual representation of the first actual physical location in the multi-dimensional fabric user interface; and while in the multi-dimensional fabric user interface that virtually represents a second actual physical location, enable the user to interact with virtual objects in the virtual representation of the second actual physical location and other users at the virtual representation of the second actual physical location to execute one or more of the following actions: upload data, download data, post data, and live stream data.

In some embodiments of the augmented reality system for enabling enhanced functionality in a virtual environment, the remote server when executing the server computer instructions further causes the remote server to: enable the user to look through the first location side of the portal and see the virtual representation of the second actual physical location in the multi-dimensional fabric user interface from the virtual representation of the first actual physical location in the multi-dimensional fabric user interface. In another aspect of some embodiments, the remote server when executing the server computer instructions further causes the remote server to: enable the user to look through the first location side of the portal and see other users in the virtual representation of the second actual physical location in the multi-dimensional fabric user interface from the virtual representation of the first actual physical location in the multi-dimensional fabric user interface.

In still another aspect of some embodiments, the remote server when executing the server computer instructions further causes the remote server to: enable the user to look through the first location side of the portal and interact with one or more of other users, virtual locations, and virtual events in the virtual representation of the second actual physical location in the multi-dimensional fabric user interface from the virtual representation of the first actual physical location in the multi-dimensional fabric user interface. In yet another aspect of some embodiments, the remote server when executing the server computer instructions further causes the remote server to: enable the user to look through the second location side of the portal and see the virtual representation of the first actual physical location in the multi-dimensional fabric user interface from the virtual representation of the second actual physical location in the multi-dimensional fabric user interface. In other aspects of some embodiments, the remote server when executing the server computer instructions further causes the remote server to: enable the user to enter the second location side of the portal and travel to the virtual representation of the first actual physical location in the multi-dimensional fabric user interface from the virtual representation of the second actual physical location in the multi-dimensional fabric user interface.

In some embodiments of the augmented reality system for enabling enhanced functionality in a virtual environment, the personal mobile computing devices are selected from a group of computers, smart phones, and smart watches. In another aspect of some embodiments, the plurality of display devices are any device that has an accessible display screen, such as television monitor, computer monitor, tablet screen, smart phone screen, automobile-mounted display screen, and the like. In still another aspect of some embodiments, the user-selectable filters are employed by the system to control what each user sees and experiences in the multi-dimensional fabric user interface. In yet another aspect of some embodiments, users with the user-selectable same filters enabled have the same virtual experience in the multi-dimensional fabric user interface, while users with different user-selectable filters enabled have different virtual experience in the multi-dimensional fabric user interface. In another aspect of some embodiments, the virtual objects include stores, restaurants, vendors, offices, buildings, parking lots, parks, and the like. In still another aspect of some embodiments, the multi-dimensional fabric user interface contains at least one advertisement at a specific virtual location and for a specific period of time.

In other embodiments of the augmented reality system for enabling enhanced functionality in a virtual environment, the multiple users of the system for augmented reality system choose to visit a specific location and appear as their own avatar. In another aspect of some embodiments, the multiple users of the system for augmented reality system choose to visit a specific location be anonymous without giving up your location.

In some embodiments of the augmented reality system for enabling enhanced functionality in a virtual environment, distance is measured in minutes by travel time-distance, not by actual distance. In another aspect of some embodiments, the augmented reality system relates to a travel time for specific modes of transportation. In still another aspect of some embodiments, the specific modes of transportation include automobile, bicycle, and pedestrian. In yet another aspect of some embodiments, the travel time-distance in the augmented reality system accounts for traffic, whether, accidents, road conditions, toll roads, one-way streets, available sidewalks, available bicycle trails, protests, and the like. In another aspect of some embodiments, the travel time-distance in the augmented reality system is shown by concentric "time rings" radiating out from a user that each represent a number of minutes of elapsed time.

In one or more embodiments of the augmented reality system for enabling enhanced functionality in a virtual environment, the manipulation of the multi-dimensional fabric user interface based on the received input from the users include anchoring digital content to the multi-dimensional fabric user interface. In another aspect of some embodiments, the manipulation of the multi-dimensional fabric user interface is based on the received input from the user includes anchoring digital content to a user in the multi-dimensional fabric user interface. In yet another aspect of some embodiments, the system may access weather data and display the weather at the first actual location at the virtual representation of the first actual location (e.g., if the weather data shows rain, then it would be raining on the user's avatar as the user walks down a street in the virtual representation of the actual physical location in the multi-dimensional fabric user interface). In another embodiment, the one or more of uploading data and downloading data includes purchasing a product or service, and wherein one or more of uploading data and downloading data include selling a product or service.

In another implementation, the present disclosure is directed towards an augmented reality system for enabling enhanced functionality in a virtual environment, in which the system comprises a remote server. The remote server includes a server memory that stores server computer instructions and a server processor that when executing the server computer instructions cause the remote server to perform the following: provide a multi-dimensional fabric user interface to a display device that is a virtual representation of a first actual physical location based on a valid authentication of a personal mobile computing device; manipulate the multi-dimensional fabric user interface based on received input from the user via their associated plurality of personal mobile computing devices; and provide the manipulated multi-dimensional fabric user interface to the display device to be displayed to the user; enable the user to create a portal in the virtual representation of the first actual physical location that facilitates travel to a virtual representation of a second actual physical location in the multi-dimensional fabric user interface, the portal having a first location side and a second location side; enable the user to enter the first location side of the portal and travel to the virtual representation the second actual physical location in the multi-dimensional fabric user interface from the virtual representation of the first actual physical location in the multi-dimensional fabric user interface; and while in the multi-dimensional fabric user interface that virtually represents a second actual physical location, enable the user to interact with virtual objects in the virtual representation of the second actual physical location and other users at the virtual representation of the second actual physical location to execute one or more of the following actions: upload data, download data, post data, and live stream data.

In still another embodiment, the one or more of uploading data and downloading data includes purchasing a product or service, and wherein one or more of uploading data and downloading data include selling a product or service.

In yet another implementation, the present disclosure is directed towards an augmented reality method for enabling enhanced functionality in a virtual environment. The method includes: accessing a remote server including a server processor and a server memory that stores server computer instructions; providing a multi-dimensional fabric user interface to a display device that is a virtual representation of a first actual physical location based on a valid authentication of a personal mobile computing device; manipulating the multi-dimensional fabric user interface based on received input from the user via their associated plurality of personal mobile computing devices; providing the manipulated multi-dimensional fabric user interface to the display device to be displayed to the user; enabling the user to create a portal in the virtual representation of the first actual physical location that facilitates travel to a virtual representation of a second actual physical location in the multi-dimensional fabric user interface, the portal having a first location side and a second location side; enabling the user to enter the first location side of the portal and travel to the virtual representation the second actual physical location in the multi-dimensional fabric user interface from the virtual representation of the first actual physical location in the multi-dimensional fabric user interface; and while in the multi-dimensional fabric user interface that virtually represents a second actual physical location, enabling the user to interact with virtual objects in the virtual representation of the second actual physical location and other users at the virtual representation of the second actual physical location to execute one or more of the following actions: upload data, download data, post data, and live stream data.

In some embodiments of the augmented reality method for enabling enhanced functionality in a virtual environment, the remote server when executing the server computer instructions further causes the remote server to: enabling the user to look through the first location side of the portal and see the virtual representation of the second actual physical location in the multi-dimensional fabric user interface from the virtual representation of the first actual physical location in the multi-dimensional fabric user interface. In another aspect of some embodiments, the remote server when executing the server computer instructions further causes the remote server to: enabling the user to look through the first location side of the portal and see other users in the virtual representation of the second actual physical location in the multi-dimensional fabric user interface from the virtual representation of the first actual physical location in the multi-dimensional fabric user interface.

In still another aspect of some embodiments, the remote server when executing the server computer instructions further causes the remote server to: enabling the user to look through the first location side of the portal and interact with one or more of other users, virtual locations, and virtual events in the virtual representation of the second actual physical location in the multi-dimensional fabric user interface from the virtual representation of the first actual physical location in the multi-dimensional fabric user interface. In yet another aspect of some embodiments, the remote server when executing the server computer instructions further causes the remote server to: enabling the user to look through the second location side of the portal and see the virtual representation of the first actual physical location in the multi-dimensional fabric user interface from the virtual representation of the second actual physical location in the multi-dimensional fabric user interface. In other aspects of some embodiments, the remote server when executing the server computer instructions further causes the remote server to: enabling the user to enter the second location side of the portal and travel to the virtual representation of the first actual physical location in the multi-dimensional fabric user interface from the virtual representation of the second actual physical location in the multi-dimensional fabric user interface.

In yet another implementation, the present disclosure is directed towards an augmented reality system for enabling enhanced functionality in a virtual environment, in which the system comprises a remote server. The remote server includes a server memory that stores server computer instructions and a server processor that when executing the server computer instructions cause the remote server to perform the following: provide a multi-dimensional fabric user interface to a display device that is a virtual representation of a first actual physical location at a first date and time based on a valid authentication of a personal mobile computing device; manipulate the multi-dimensional fabric user interface based on received input from the user via their associated plurality of personal mobile computing devices; provide the manipulated multi-dimensional fabric user interface to the display device to be displayed to the user; enable the user to create a portal in the virtual representation of the first actual physical location at the first date and time that facilitates travel to a virtual representation of a second actual physical location at a second date and time in the multi-dimensional fabric user interface, the portal having a first location side and a second location side; enable the user to enter the first location side of the portal and travel to the virtual representation the second actual physical location at the second date and time in the multi-dimensional fabric user interface from the virtual representation of the first actual physical location at the first date and time in the multi-dimensional fabric user interface; and while in the multi-dimensional fabric user interface that virtually represents a second actual physical location at the second date and time, enable the user to interact with virtual objects in the virtual representation of the second actual physical location at the second date and time, and other users at the virtual representation of the second actual physical location at the second date and time to execute one or more of the following actions: upload data, download data, post data, and live stream data.

The embodiments described in the present disclosure improve upon known data storage architectures, structures, processes, and techniques in a variety of different computerized technologies, such as operating systems, user interfaces, and social networks.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
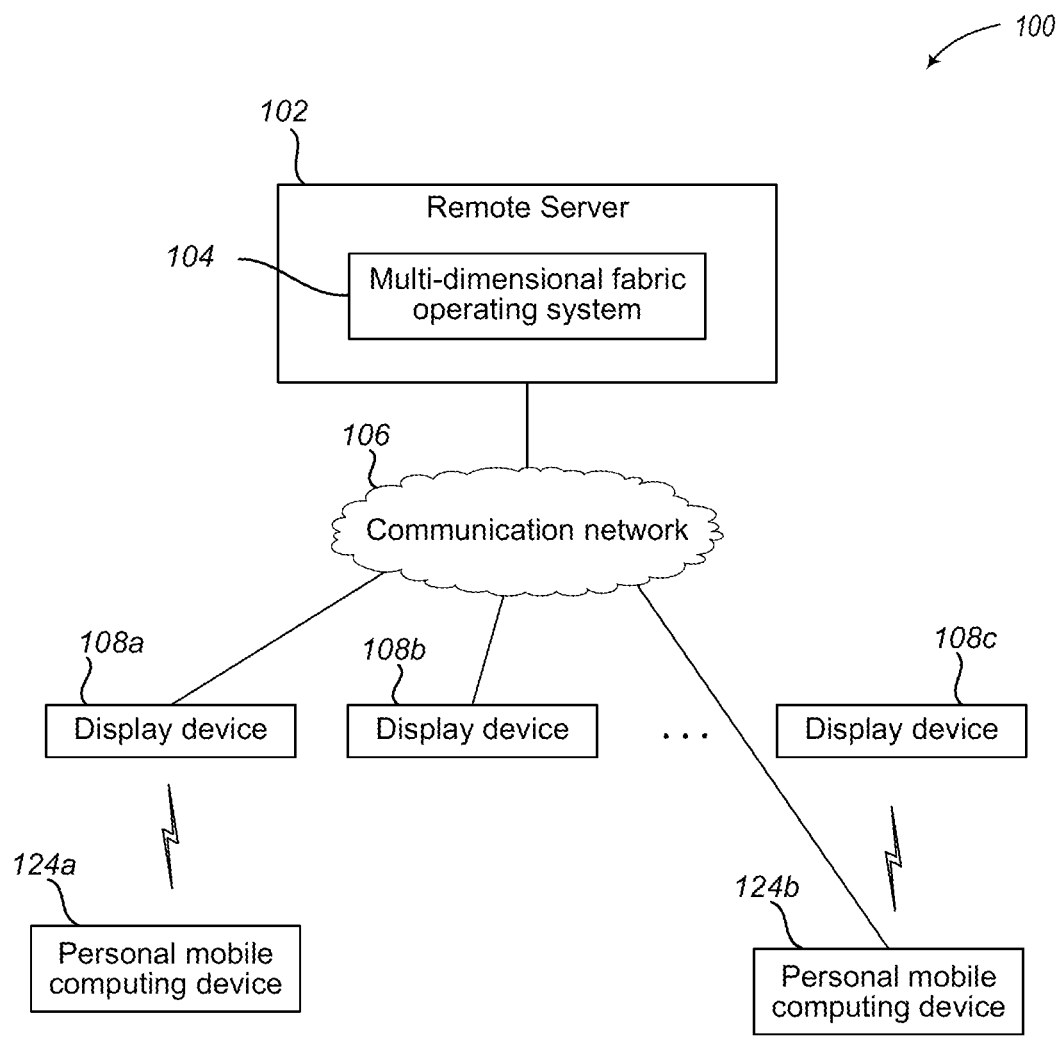
FIG. 1 illustrates a context diagram of an environment that provides a multi-dimensional fabric user interface for storing content in accordance with embodiments described herein.

FIG. 1 illustrates a context diagram of an augmented reality system for enabling enhanced functionality in a virtual environment in which an environment 100 that provides a multi-dimensional fabric user interface for storing content in accordance with embodiments described herein. In the illustrated example, environment 100 includes a remote server 102, one or more display devices 108a-108c, and one or more personal mobile computing devices.

The remote server 102 in the augmented reality system for enabling enhanced functionality in a virtual environment is configured as a remote computing system, e.g., cloud computing resources, which implements or executes a multi-dimensional fabric operating system 104. In various embodiments, a separate instance of the multi-dimensional fabric operating system 104 is maintained and executing for each separate personal mobile computing device 124a, 124b. In some embodiments, the multi-dimensional fabric user interface may be implemented as an operating shell.

Although not illustrated, the remote server 102 may also be running various programs that are accessible to the users of the personal mobile computing devices 124a, 124b via the multi-dimensional fabric operating system 104. Accordingly, the environment and system described herein make it possible for a plurality of applications to be run in the cloud, and a user accesses a particular application by moving the fabric to that application's coordinates.

The multi-dimensional fabric operating system 104 in the augmented reality system for enabling enhanced functionality in a virtual environment stores content according to a plurality of different dimensions. In some embodiments, the content is stored based on when the content was captured by the user or when it was stored by the remote server 102 (e.g., a time stamp added to a picture when the picture was captured or a time stamp when the picture was uploaded to the remote server), where the content was captured by the user (e.g., the location of the camera that captured the picture or a location of a display device used to upload the picture from the camera to the remote server), and what the content is about (e.g., food, clothing, entertainment, transportation, etc.).

A user in the augmented reality system for enabling enhanced functionality in a virtual environment can access the multi-dimensional fabric operating system 104 via a display device 108a. The user has a personal mobile computing device 124, which can create or obtain content. The user can walk up to or approach a display device 108. The display device 108 coordinates authentication of the personal mobile computing device 124 with the remote server 102. The user can then use the display device 108 as a personal computer to upload content from the personal mobile computing device 124 to the remote server 102 using the multi-dimensional fabric operating system 104. Similarly, the user can use the display device 108 to access content previously stored by the multi-dimensional fabric operating system 104. For example, the user can use hand gestures, or touch interfaces, to provide input that manipulates a user interface displayed on the display device 108, where the user interface is generated by the multi-dimensional fabric operating system 104. The remote server 102 can respond to the input by providing an updated user interface of the multi-dimensional fabric to the display device 108 for display to the user. Notably, the user may transmit between the personal mobile computing device 124b and the remote server 102 via the communication network 106, without connecting to a display device 108 in some embodiments.

Figure 2:
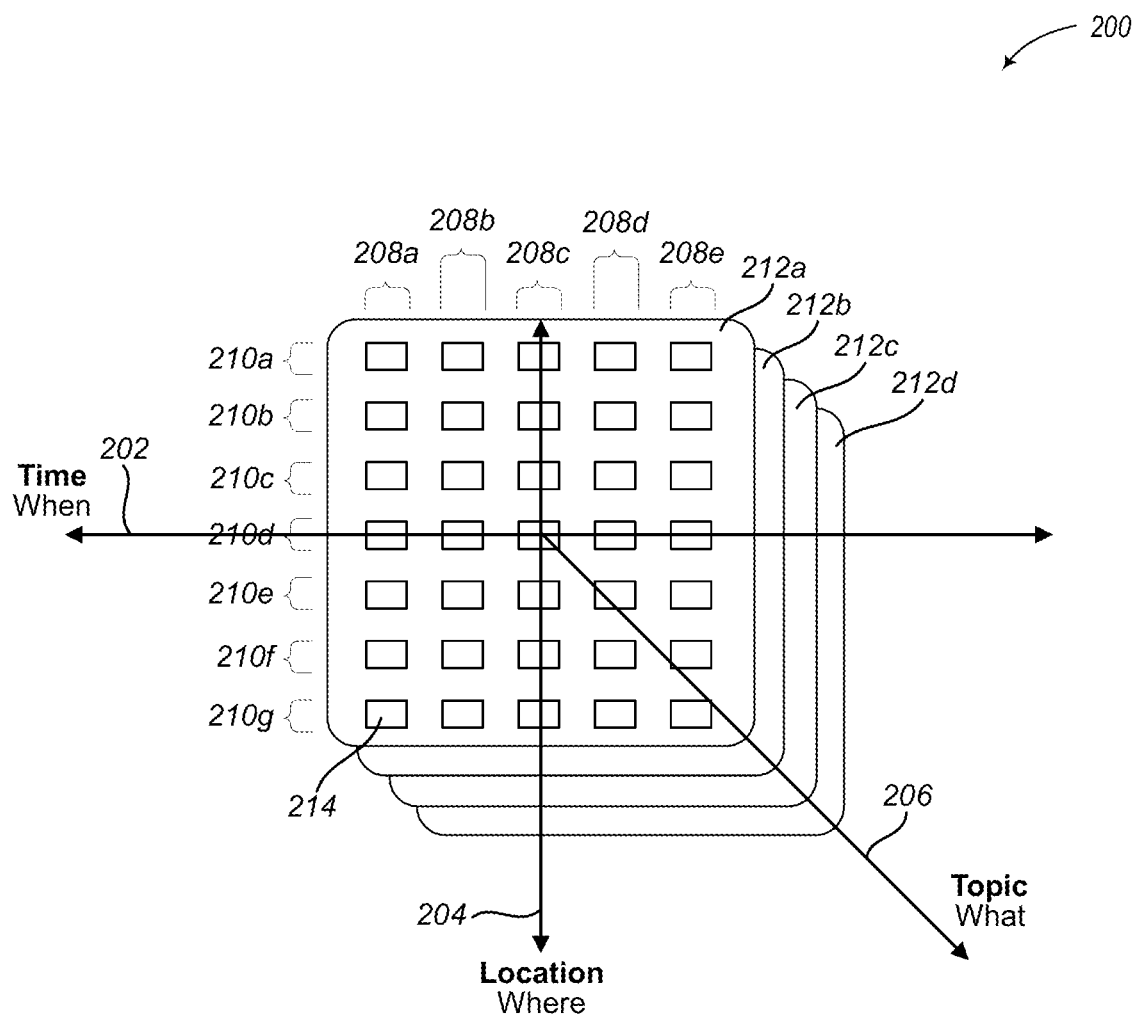
FIG. 2 illustrates a graphical representation of a multi-dimensional fabric user interface for storing content in accordance with embodiments described herein.
Figure 3:
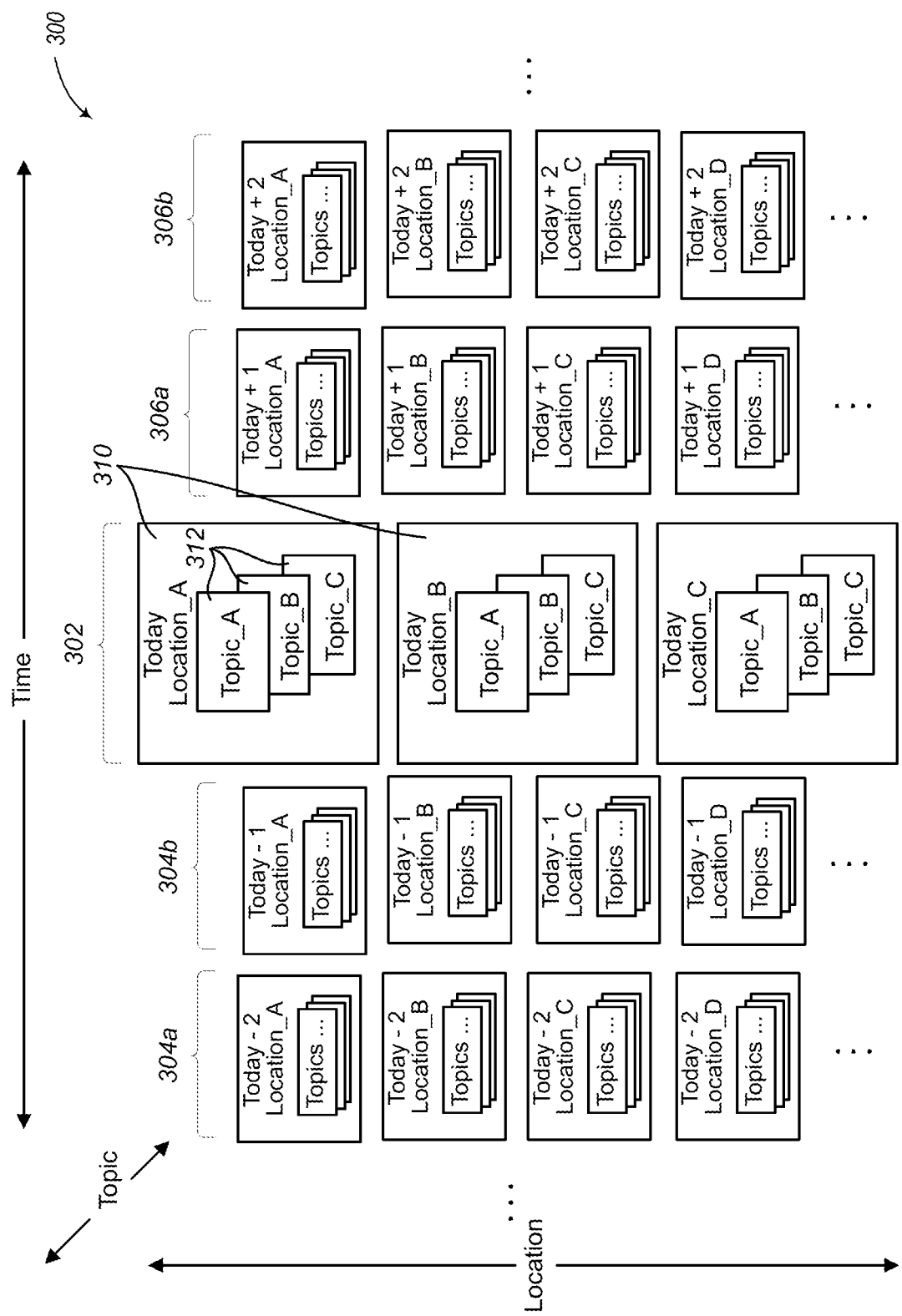
FIG. 3 illustrates another graphical representation of a multi-dimensional fabric user interface for storing content in accordance with embodiments described herein.

FIGS. 2 and 3 illustrate graphical representations of use case examples of a multi-dimensional fabric user interface for storing content in an augmented reality system for enabling enhanced functionality in a virtual environment described herein.

Example fabric 200 in FIG. 2 includes a time axis 202, a location axis, and a topic axis 206. Although fabric 200 appears to be constrained in each axis, embodiments are not so limited. Rather, fabric or graphical environment is flexible, while the coordinate is fixed. This allows a user to use cruder movements, like the swipe of an arm, to achieve refined movement to arrive at the content. This also reduces the content footprint because it does not need to manage a file structure, which improves throughput to a degree that it can run entirely in the cloud.

In some embodiments, users in the multi-dimensional fabric system navigate by moving the environment, or fabric, to a specific content or item. The content is placed within a 3-Dimensional structure of Time (when)+Location (where)+Topic (what), which may be in the form of a multi-dimensional coordinate system. By configuring the content in the fabric based on 3 dimensions (What, When, Where), the fabric provides a pre-configured scaffold that allows a user to navigate the plurality of content without the multi-dimensional fabric system fetching and organizing it. The fabric makes discovering more relevant content immediately accessible.

The time axis 202 in the multi-dimensional fabric system t may be arranged as a plurality of different time periods, such as hours or days. In various embodiments, the current time period (e.g., today) is shown in the middle column 208c, which is shown in FIG. 3. The location axis 204 may be arranged as a plurality of different locations. In some embodiments, the content locations are selected based on a distance from a current location of the display device that is accessing the fabric 200. For example, locations closest to the display device are arranged in the top column 210a and the locations furthest from the display device are arrange in the bottom column 210g. Likewise, topics may be arranged based on themes or nearest to the display device. For example, food content may be in layer 212a, entertainment content in layer 212b, transportation content in layer 212c, etc. In other embodiments, the topics may be arranged based on frequency of access to the user based on location.

The fabric 200 in the multi-dimensional fabric system illustrates a plurality of icons 214 that each represent separate content (also referred to as content 214). The content 214 is laid out in a plurality of time periods 208a-208e (columns), a plurality of locations 210a-210g (rows), and a plurality of topics 212a-212d (layers), using coordinates associated with the separate dimensions. For any given point defined by (What, When, Where) there is a finite amount of content or data. As a result, users can simply point out a certain What, When, and Where to know where something is located and can directly access it from that point.

In some embodiments of the augmented reality system for enabling enhanced functionality in a virtual environment, the location rows 210, time columns 208, and topic layers may be independent from one another such that a user can manipulate a single axis. In other embodiments, the user can manipulate two or more axes. For example, a user can vertically scroll along the location axis 204 through a single column (e.g., single time period on the time axis), such as column 208c, without affecting the other columns or layers, or the user can vertically scroll along the location axis 204 for multiple columns or multiple layers, or both. Likewise, the user can horizontally scroll along the time axis 202 through a single row (e.g., single location on the location axis), such as row 210d, without affecting the other rows or layers, or the user can horizontally scroll along the time axis 202 for multiple rows or multiple layers, or both. Moreover, the user can depth scroll along the topic axis 206 through a single layer (e.g., single topic on the topic axis), such as layer 212a, without affecting the other rows or columns, or the user can depth scroll along the topic axis 206 for multiple rows or multiple columns, or both.

By providing input to one or more axes in the augmented reality system for enabling enhanced functionality in a virtual environment, the user can manipulate or move the fabric 200 to access content for a specific time, a specific location, and a specific topic. The user can scroll on a particular axis by providing one or more hand gestures. For example, a horizontal movement of the user's arm may move the time axis 202, a vertical movement of the user's arm may move the location axis 204, and an in-or-out movement of the user's arm may move the topic axis 206. The user can then select a specific content 214, such as the content in the middle (along time and location axes) and on top (along the topic axis) of the fabric by moving their arm away from the display screen or by making a first or by opening their hand.

In some embodiments of the augmented reality system for enabling enhanced functionality in a virtual environment, the fabric will look two dimensional to a user, but is actually three dimensional, such that when a two-dimensional point is selected by the user, the user can switch axes to view the third dimension. And although FIG. 2 shows the time axis 202 and the location axis 204 on this top-level two-dimensional view, other combinations of axes may also be used, e.g., time v. topic, location v. topic, or other non-illustrated axes.

Example fabric 300 in FIG. 3 is similar to fabric 200 in FIG. 2, but is an example of how the fabric 300 can be displayable to a user outside of a common virtual space.

Figure 5:
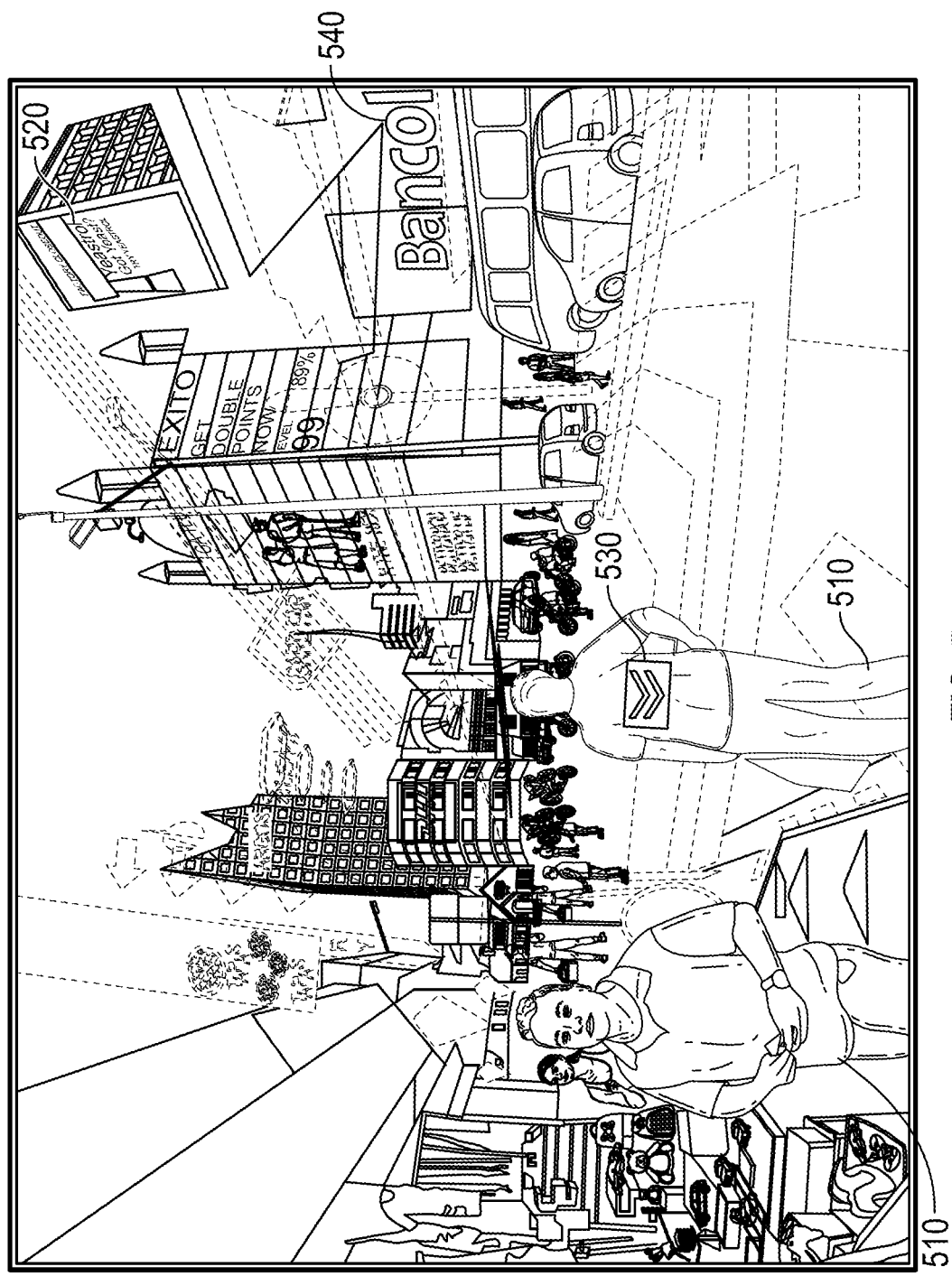
FIG. 5 illustrates a multi-dimensional fabric user interface at a first time that is accessed from disparate virtual and physical spaces via multiple users each having a processor-based device, in which store fronts are viewable but there are no advertisements are viewable.
Figure 6:
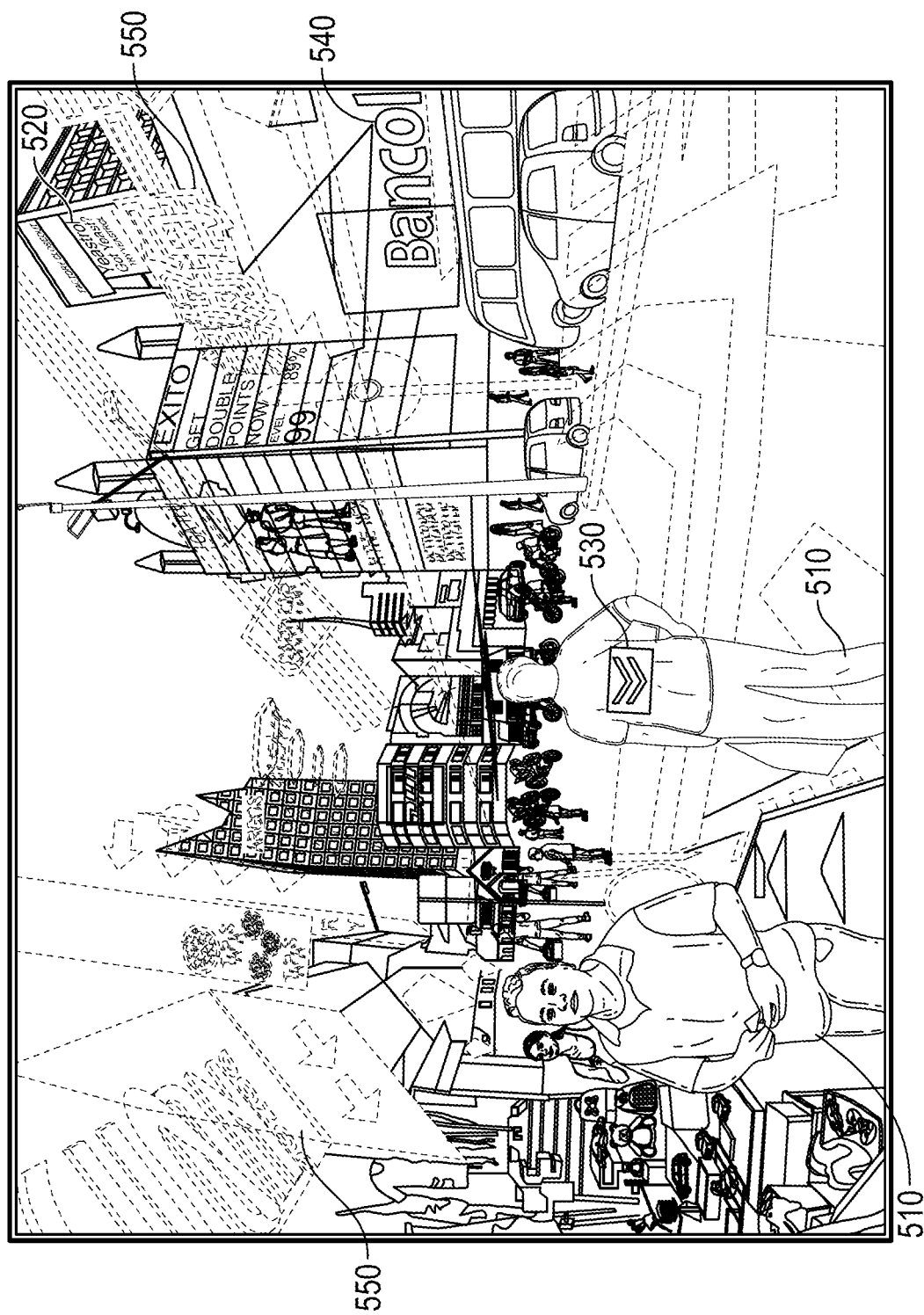
FIG. 6 illustrates a multi-dimensional fabric user interface at a second time that is accessed from disparate virtual and physical spaces via multiple users each having a processor-based device, in which store fronts are viewable and a first group of advertisements are viewable.
Figure 7:
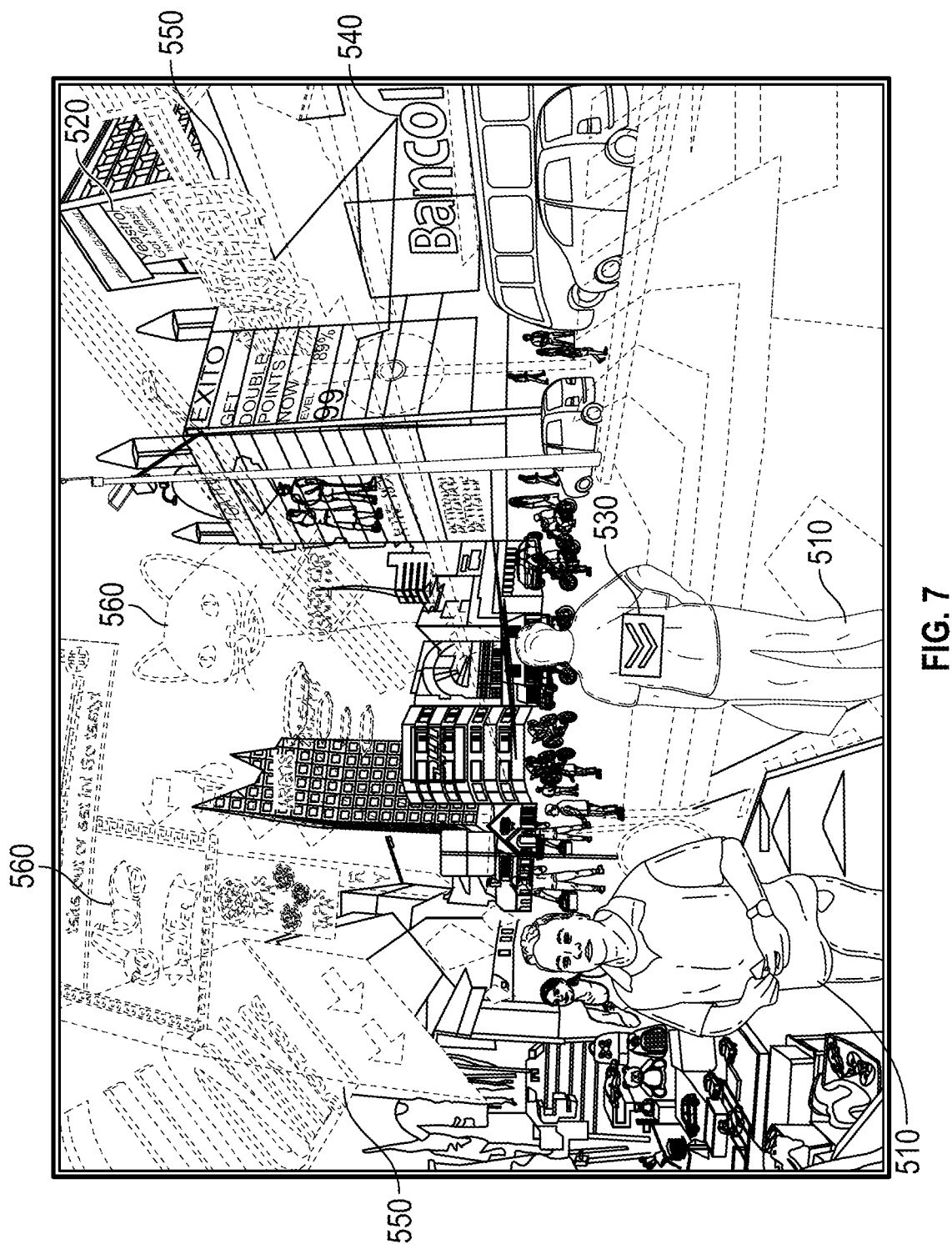
FIG. 7 illustrates a multi-dimensional fabric user interface at a third time that is accessed from disparate virtual and physical spaces via multiple users each having a processor-based device, in which store fronts are viewable and a first and second group of advertisements are viewable.

Examples of using a multi-dimensional fabric within a common virtual space are shown in FIGS. 5-7.

In this example illustration in FIG. 3, the current time period 302 is illustrated in a middle column with future time periods 306a, 306b to the right of the current time period 302 and past time periods 304a, 304b to the left of the current time period. Each location 310 in the current time period 302 includes a plurality of topics 312. These topics 312 are similar to the layers 212 in FIG. 2.

Again, the user in the multi-dimensional fabric system can move or manipulate the fabric 300 along one or more axes to select a particular piece of content. Once selected, the particular content is displayed to the user. Various embodiments of the multi-dimensional fabric described herein can be used for a variety of different content storage technologies. One example technology is the fluid timeline social network described in U.S. patent application Ser. No. 16/300,028, filed Nov. 8, 2018, titled FLUID TIMELINE SOCIAL NETWORK, and issued Aug. 18, 2020, as U.S. Pat. No. 10,747,414, which is incorporated herein by reference.

The operation of certain aspects of the disclosure will now be described with respect to FIGS. 4A and 4B. In at least one of various embodiments of the augmented reality system for enabling enhanced functionality in a virtual environment, process 400 described in conjunction with FIG. 4A may be implemented by or executed by a system of one or more computing devices, such as display device 108 in FIG. 1, and process 500 described in conjunction with FIG. 4B may be implemented by or executed by a system of one or more remote computing devices, remote server 102.

Figure 4A:
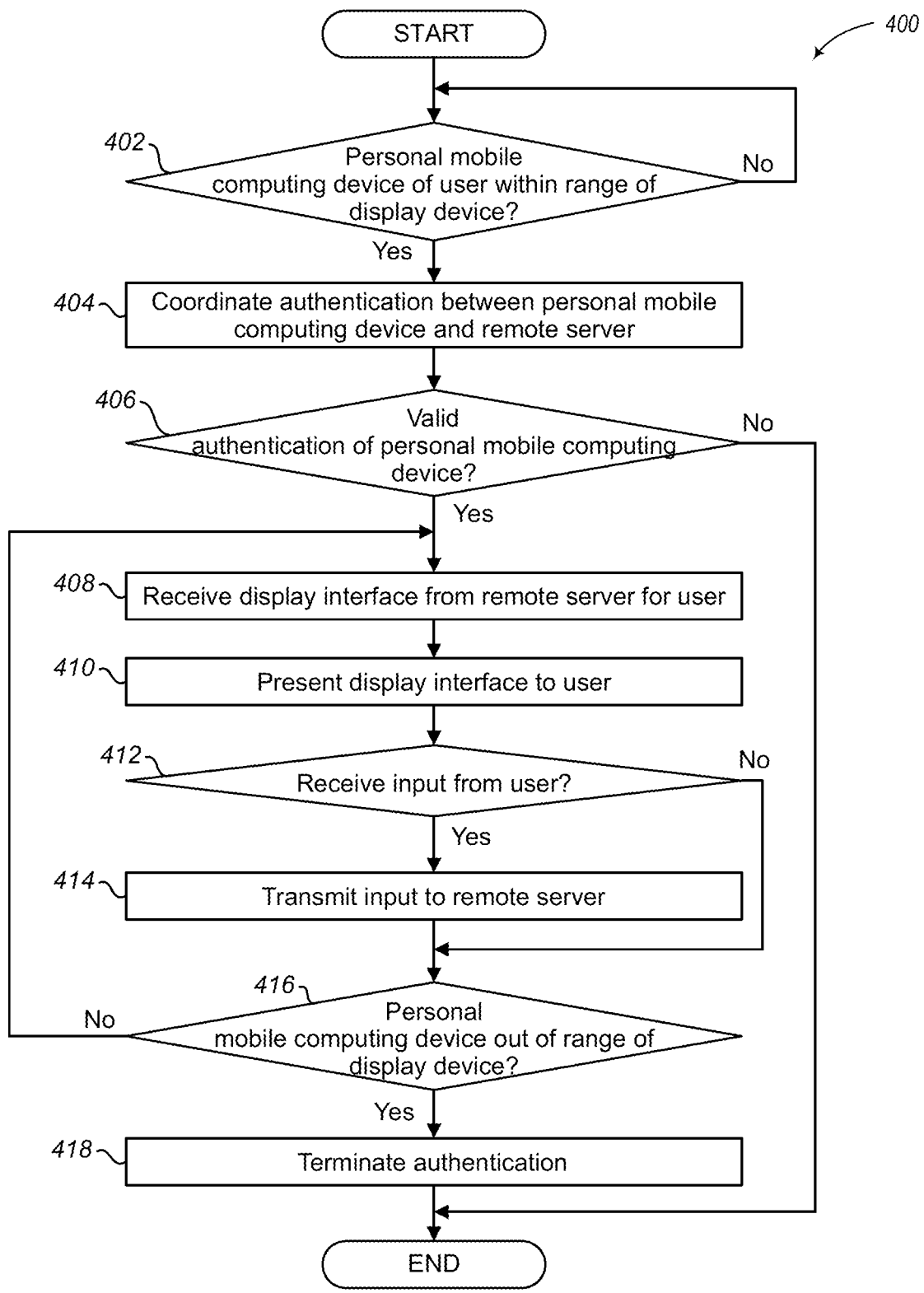
FIG. 4A illustrates a logical flow diagram generally showing one embodiment of a process for accessing a remote server from a display device to present a graphical user interface of a multi-dimensional fabric user interface in accordance with embodiments described herein.

FIG. 4A illustrates a logical flow diagram generally showing one embodiment of a process 400 for accessing a remote server from a display device to present a graphical user interface of a multi-dimensional fabric in accordance with embodiments described herein.

Process 400 begins, after a start block, at decision block 402, where a determination is made whether a personal mobile computing device of a user is within range of the display device. This determination may be made when the personal mobile computing device is within a threshold distance from the display device (e.g., using one or more range detection devices) or when the user indicates or requests to interact with the display device. If the personal mobile computing device is within range of the display device, then process 400 flows to block 404; otherwise process 400 loops to decision block 402 until a personal mobile computing device is within range of the display device.

At block 404, the display device coordinates authentication between the personal mobile computing device and a remote server. This coordination may include obtaining, requesting, or otherwise forwarding authentication keys or other information to determine the validity or authenticity of the personal mobile computing device as being authorized to access the remote server.

Process 400 proceeds to decision block 406, where a determination is made whether the personal mobile computing device is validly authenticated with the remote server. In some embodiments, the remote server may provide a token, session identifier, or other instruction to the display device indicating that the user of the personal mobile computing device is authorized to access the remote server via the display device. If the personal mobile computing device is valid, then process 400 flows to block 408; otherwise, process 400 terminates or otherwise returns to a calling process to perform other actions.

At block 408, the display device receives a display interface from the remote server for the user. In various embodiments, the display interface is customized for the user, such as if the user logged directly onto the remote server to access personal content. As described herein, this display interface is a multi-directional fabric that the user can manipulate, as described herein.

Process 400 continues at block 410, where the display device presents the display interface to the user of the personal mobile computing device. In some embodiments, the display interface is displayed directly by the display device. In other embodiments, the display interface is displayed via the personal mobile computing device.

Process 400 proceeds next to decision block 412, where a determination is made whether the display device has received input from the user. As described herein, the input may be provided via a hand gesture without touching a screen of the display device. Such hand gesture may be a swipe left or right, swipe up or down, or movement towards or away from the screen of the display device. A selection input can then be received if the user rapidly moves their hand away from the screen of the display device or if the user opens or closes his/her hand. If user input is received, then process 400 flows to block 414; otherwise, process 400 flows to decision block 416.

At block 414, the display device transmits the user input to the remote server. Process 400 proceeds to decision block 416, where a determination is made whether the personal mobile computing device is out of range of the display device (e.g., outside of a threshold distance or the user de-activated the session. If not, process 400 loops to block 408 to receive an updated or modified display interface (based on the user input) and present it to the user. If the personal mobile computing device is out of range of the display device, then process 400 flows to block 418 to terminate the authentication with the remote server.

After block 418, process 400 may terminate or otherwise return to a calling process to perform other actions. In some embodiments, process 400 may loop to decision block 402 to wait for another personal mobile computing device to be within range of the display device.

Figure 4B:
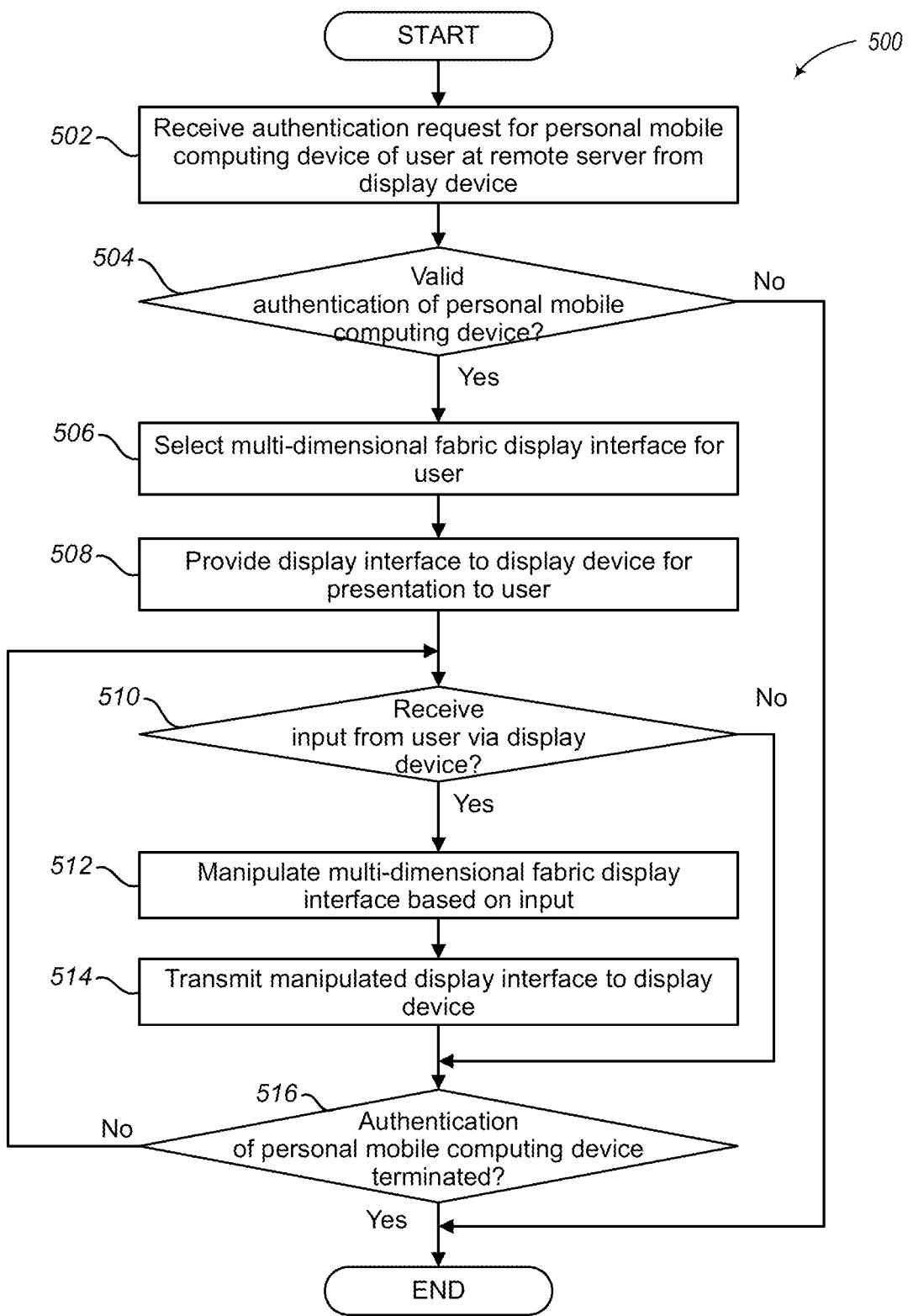
FIG. 4B illustrates a logical flow diagram generally showing one embodiment of a process for a remote server to provide a graphical user interface of a multi-dimensional fabric user interface to a display device in accordance with embodiments described herein.

FIG. 4B illustrates a logical flow diagram generally showing one embodiment of a process 450 in the augmented reality system for enabling enhanced functionality in a virtual environment for a remote server to provide a graphical user interface of a multi-dimensional fabric to a display device in accordance with embodiments described herein.

Process 450 begins, after a start block, at block 452, where an authentication request is received at a remote server from a display device for a personal mobile computing device of a user. In some embodiments, the authentication request may include encryption keys, user credentials, or other authentication information.

Process 450 proceeds to decision block 454, where a determination is made whether the personal mobile computing device is validly authenticated or not. If the personal mobile computing device is valid, process 450 flows to block 456; otherwise, process 450 terminates or otherwise returns to a calling process to perform other actions.

At block 456, the remote server selects a multi-dimensional fabric display interface for the user of the personal mobile computing device. In some embodiments, the remote server instantiates or accesses a previously running version of the multi-dimensional fabric operating system for the user. In various embodiments, each separate user (or a group of multiple users) has a corresponding multi-dimensional fabric user interface accessible via the remote server. The multi-dimensional fabric display interface with content laid out in a fabric-like structure based on at least time, location, and topic such that the user can manipulate or move the fabric in one or more dimensions to select content.

Process 450 proceeds to block 458, where the remote server provides the selected display interface to the display device for presentation to the user. Process 450 continues at decision block 454, where a determination is made whether user input has been received from the display device. In various embodiments, the input may be a change or selection of one or more dimensions of the fabric or a user selection. If user input has been received, process 450 flows to block 462; otherwise, process 450 flows to decision block 466.

At block 462, the remote server manipulates the multi-dimensional fabric display interface based on the user input. In some embodiments, the manipulated display interface may include displaying specific content selected by the user. In other embodiments, the manipulated display interface may show a different section or area of the multi-dimensional fabric user interface based on the user input.

Process 450 proceeds next to block 464, where the remote server transmits the manipulated display interface to the display device. Process 450 continues next at decision block 466, where a determination is made whether the authentication of the personal mobile computing device has terminated. In some embodiments, the display device transmits a termination request to the remote server when the user of the personal mobile computing device walks away from or is out of range of the display device. If the authentication is terminated, process 450 terminates or otherwise returns to a calling process to perform other action; otherwise, process 450 loops to decision block 460 to receive additional user input from the display device.

Referring now to FIGS. 5, 6, and 7, the system for synchronized common virtual spaces displays a multi-dimensional fabric user interface that may be accessed from disparate virtual and physical spaces by a first user 510 and a second user 512, each having a processor-based computing device, such as a computer, smart phone, smart watch, or the like, such as the personal mobile computing devices 124 or display devices 108 shown in FIG. 1. The first user 510 and second user 512 may each enter the multi-dimensional fabric user interface and have a synchronized experience if they come to the same virtual location at the same virtual time. Additionally, as will be described in further detail below, filters are also employed by the system to control what each user 510, 512 sees and experiences in the multi-dimensional fabric user interface, thus enabling user-control of the "what," "where," and "when." In this manner, the "where" is the virtual location within the multi-dimensional fabric user interface that corresponds to an actual physical location that the user 510 selects to visit. Next, the "when" is the time of day and date at which the user selects to visit. Finally, the "what" is the content that is visible to the user to see and interact with based on the filters selected by the user 510.

Accordingly, the first user 510 and the second user 512 with the same user-selectable filters enabled have the same virtual experience in the multi-dimensional fabric user interface, while users 510, 512 with different user-selectable filters enabled have different virtual experiences in the multi-dimensional fabric user interface while still being in the same common virtual space. In some embodiments of the synchronized common virtual space, the first user 510 may interact with the virtual location and the second user 512 (or more) in the multi-dimensional fabric user interface to buy or sell goods or content, upload content to or download content from the multi-dimensional fabric, post, live stream, and the like. In one or more embodiments, the user 510 interacts with the synchronized common virtual space of the multi-dimensional fabric user interface by anchoring digital content 520 to a fixed location in the multi-dimensional fabric user interface of the common virtual space. In other embodiments, the user 510 interacts with the synchronized common virtual space of the multi-dimensional fabric user interface by anchoring digital content 530 to a user 510 (e.g., himself, herself, or another user) in the multi-dimensional fabric user interface of the common virtual space.

In another aspect of some embodiments of the system for synchronized common virtual spaces, the first user 510 and the second user 512 enter the multi-dimensional fabric user interface from different physical locations, each using their own processor-based computing device. Both the first user 510 and the second user 512 may go to a synchronized common virtual space, which may be configured to represent an actual location in the real world. The synchronized common virtual space may contain virtual store fronts 540 of actual stores in the physical world. The synchronized common virtual space may also contain advertisements 550, 560 in the multi-dimensional fabric user interface at a specific physical location, as shown in FIGS. 6 and 7. Specifically, FIG. 5 shows a multi-dimensional fabric user interface that provides a virtual representation of an actual physical location at a first time that contains virtual store fronts 540 but which contains no advertisements. FIG. 6 shows a multi-dimensional fabric user interface that provides a virtual representation of an actual physical location at a second time that contains virtual store fronts 540 and which contains advertisements 550. FIG. 7 shows a multi-dimensional fabric user interface that provides a virtual representation of actual physical location at a third time that contains virtual store fronts 540 and which contains advertisements 550 and advertisements 560.

In some embodiments, the advertisements 550, 560 in the multi-dimensional fabric user interface at a specific physical location, such as a Billboard on a specific street (e.g., Sunset Boulevard in Los Angeles, Calif.) may display the same advertisement as in the actual physical world, while in other embodiments the advertisements 550, 560 in the multi-dimensional fabric user interface at a specific physical location may display different advertisements if a user 510 anchors different digital content 520 at that virtual location (which represents an actual physical location). The synchronized common virtual space is created by anchoring digital content 520 to virtual locations that represent physical location, not by digitizing the actual physical locations. In various embodiments, digital content 520 is anchored to a location and time within the synchronized common virtual space by the corresponding storage location of the content within the multi-dimensional fabric.

Various embodiments, of the multi-dimensional fabric described herein can be used for a variety of different content storage technologies. One example technology is the fluid timeline social network described in U.S. patent application Ser. No. 16/300,028, filed Nov. 8, 2018, titled FLUID TIMELINE SOCIAL NETWORK, and issued Aug. 18, 2020, as U.S. Pat. No. 10,747,414, which is incorporated herein by reference.

Significantly, the first user 510 and the second user 512 may choose to visit not only a specific place, but also a specific time in the synchronized common virtual spaces. For example, the first user 510 and the second user 512 of the system for synchronized common virtual spaces may choose to go to a specific physical location in the past at a specific time and date (e.g., go to a concert venue when a specific concert occurred, go to a historical location when a historical event occurred, go to a restaurant when a friend's birthday occurred, go to a church when a relative's wedding occurred, and the like). As shown in FIGS. 5, 6, and 7, in these embodiments the system for synchronized common virtual spaces displays the objects and events that are anchored to that specific location and time. This is distinct from the embodiments shown in FIGS. 2 and 3 where time and distance were used as axes. Additionally, the first user 510 and the second user 512 of the system for synchronized common virtual spaces may choose to go to a specific physical location in the future at a specific time and date (e.g., go to a concert venue when a specific concert will occur, go to a historical location when a historical event will likely occur, go to a restaurant when a friend's birthday will occur, go to a church when a relative's wedding will occur, and the like). Further, a user 510 may want to go to a location in the future and see what mobile vendors (i.e., food trucks) are available at a particular location. Moreover, in some embodiments, virtual store fronts 540 are dynamically tailored with advertisements that are set at fixed locations for a fixed time period, or as part of a live feed. A user 510 may also post advertisements 550, 560 at a time adjacent to future event or sale. In various embodiments, digital content 520 is anchored to a specific time and date in the synchronized common virtual space by the corresponding storage time of the content within the multi-dimensional fabric.

In one or more embodiments, the system may access weather data for the near future and display the forecast weather at a particular location and date at a near future date that is within weather forecasting capabilities. Of course, the display of the recorded weather at a particular location and date in the past or at the present may also be generated by the system for synchronized common virtual spaces.

Figure 8:
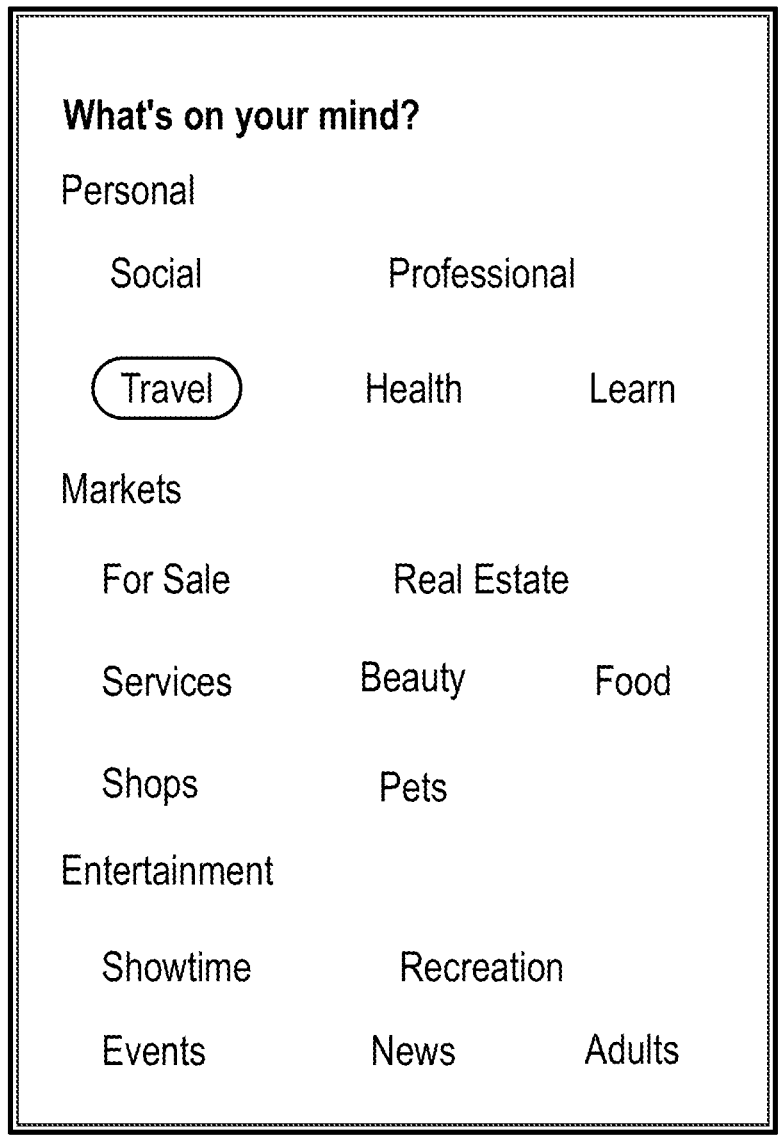
FIG. 8 illustrates a selection of filters that may be selected by a user to enable what locations and events are seen and experienced in the multi-dimensional fabric user interface, in accordance with embodiments described herein.
Figures 9A, 9B, 9C:
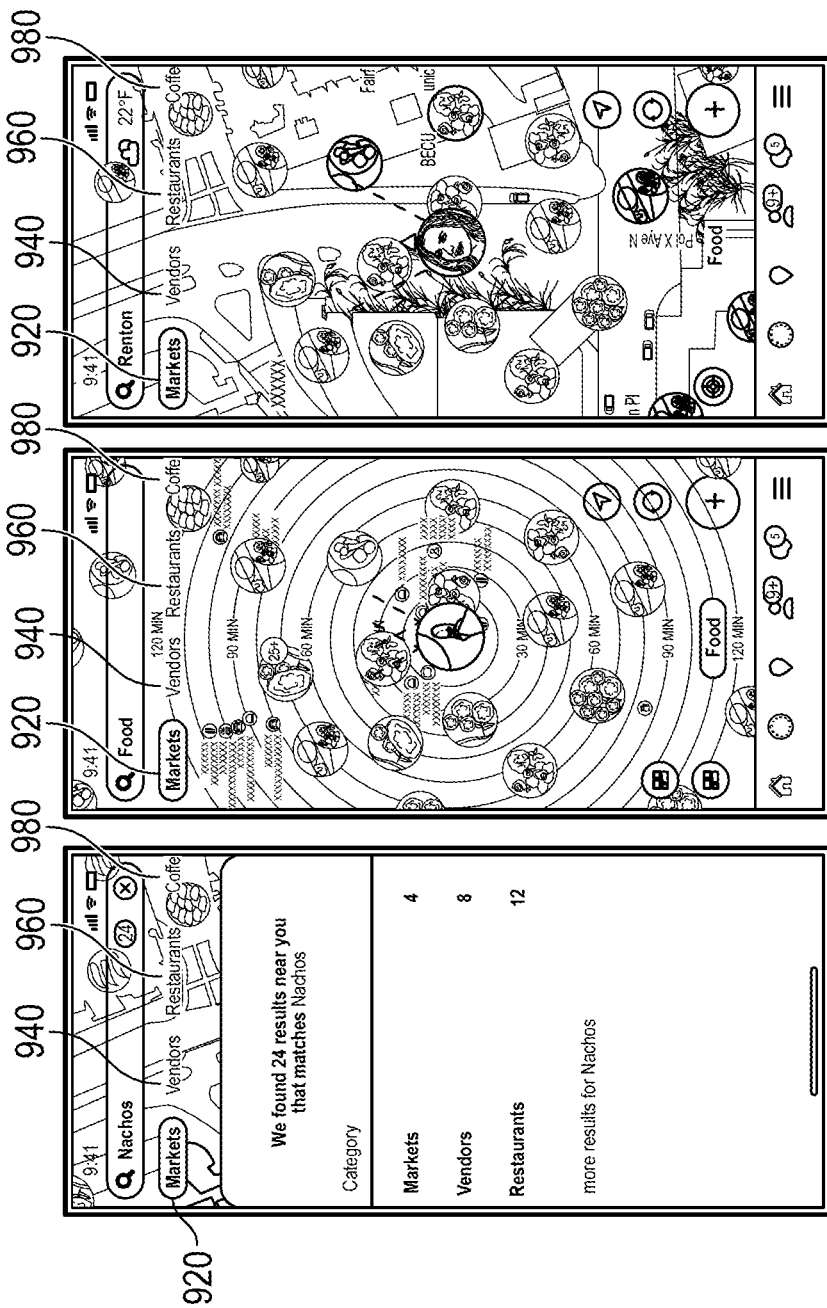
FIG. 9A illustrates a view of the multi-dimensional fabric user interface with various selected filters and search parameters entered by a user to enable what locations and events are seen and experienced, in accordance with embodiments described herein.
FIG. 9B illustrates another view of the multi-dimensional fabric user interface with various selected filters and search parameters entered by a user to enable what locations and events are seen and experienced, in accordance with embodiments described herein.
FIG. 9C illustrates still another view of the multi-dimensional fabric user interface with various selected filters and search parameters entered by a user to enable what locations and events are seen and experienced, in accordance with embodiments described herein.

Examples of various user filters that can be enabled within a common virtual space are shown in FIG. 8, which include Personal 910, Markets 920, and Entertainment 930. These filter are presented by way of example only and not by way of limitation. In some such embodiments, the Personal 910 filter includes, by way of example only, and not by way of limitation, sub-filters of: social 911, professional 912, travel 914, health 915, and learn 916. In the embodiment shown in FIG. 8, the Travel filter 914 has been selected. Additionally, in some such embodiments, the Markets 920 filter includes, by way of example only, and not by way of limitation, sub-filters of: for sale 921, real estate 922, services 924, beauty 925, food 926, shops 927, pets 928. Furthermore, in some such embodiments, the Entertainment filter includes, by way of example only, and not by way of limitation, sub-filters of: showtime, recreation, events, news, weather, adults, and the like. As shown in FIGS. 9A, 9B, 9C, other filters include, by way of example only, and not by way of limitation, vendors 940, restaurants 960, coffee 980, and the like.

Referring still to FIGS. 9A, 9B, and 9C, the locations or events that are visible in each instance of the multi-dimensional fabric user interface is controlled by the filters selected by the user. For example, what you see in the way of store fronts is controlled by filters. Each party has a multi-dimensional fabric user interface, but that interface or the content shown within the interface may appear different due to their own filters. Additionally, filters may also be used in combination with search criteria to present different iterations of the synchronized common virtual spaces. For example, in one instance shown in FIG. 9A, the user is performing a search for nachos and the system retrieves numerous search results. In this instance, the filter Markets 920 is selected, while the filters of vendors 940, restaurants 960, coffee 980, are not selected. In another iteration instance shown in FIG. 9B, the user is searching for food and viewing the search results in a circular time-space distribution of food locations and events. Again in this instance, the filter Markets 920 is selected, while the filters of vendors 940, restaurants 960, coffee 980, are not selected. In still another iteration instance shown in FIG. 9C, the user is searching the city of Renton for July 4th. In this iteration, the user may be able to see and interact with various shops, advertisements, and avatars of other users that happen to be at that same location and time, e.g., in Renton on July 4th. Once again in this instance, the filter Markets 920 is selected, while the filters of vendors 940, restaurants 960, coffee 980, are not selected.

In some embodiments of the system for synchronized common virtual spaces, a user may select whether or not they wish to be viewable by other users when visiting a specific location and time within the synchronized common virtual space of the multi-dimensional fabric user interface. If the user selects to be viewable by other users when visiting a specific location and time within the synchronized common virtual space of the multi-dimensional fabric user interface, then their avatar may be seen and interacted with by other users at that same virtual location, date, and time. If the user selects not to be viewable by other users (i.e., anonymous) when visiting a specific location and time within the synchronized common virtual space of the multi-dimensional fabric user interface, then their avatar may not be seen and interacted with by other users at that same virtual location, date, and time. In another aspect of some embodiments, acceptance into the multi-dimensional fabric user interface is usually required. The user selection of whether or not they are to be viewable may be set by location, time, or a combination of location and time.

Figure 10:
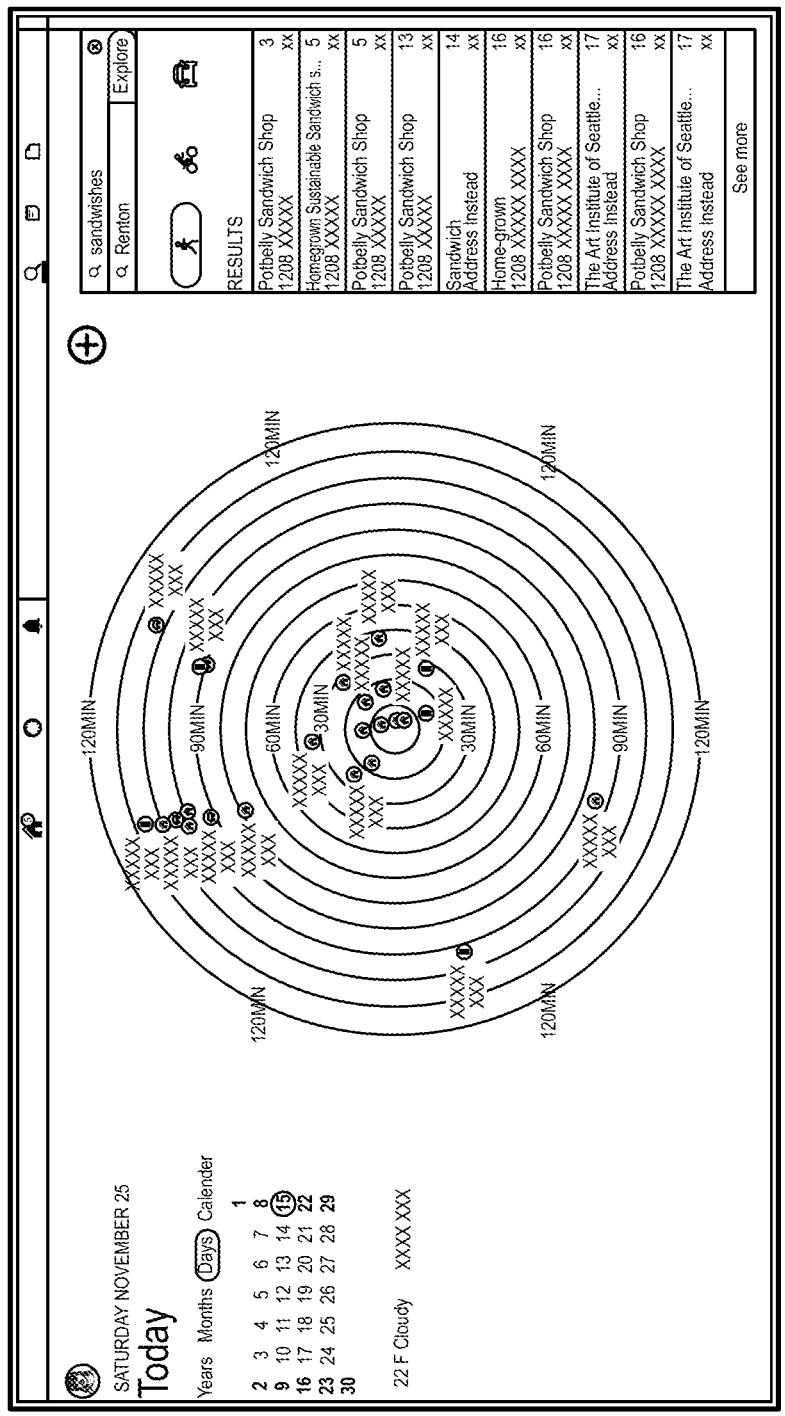
FIG. 10 illustrates one embodiment of a space-time map in which a user may perceive 120 minutes around itself, with concentric "time rings" each representing 10 additional minutes of elapsed time radiating outward from the user.

Since events are time based in their posting (e.g., anchoring in the multi-dimensional fabric user interface), a user may only see things happening while that user is at that location in space and time. In one embodiment shown in FIG. 10, a user is able to see 120 minutes 1010 around himself or herself. In this embodiment, every "time ring" 1020 represents an additional 10 minutes of elapsed time from the user's location. The "space" variable determines the circular position of the location or event on the map in the multi-dimensional fabric user interface. In the embodiment shown in FIG. 10, the left side of the screen displays a calendar 1030 with selectable dates. Additionally, in this embodiment shown in FIG. 10, the right side of the screen displays a search function 1040, search results 1050, and the mode of transportation that relates to the "time distance" 1060 of the location or event on the map from the user's current position. Example modes of transportation include automobile, bicycle, and pedestrian. The "time distance" of the location or event on the map may relate to the modes of transportation as follows: 10 minutes if automobile is selected, 20 minutes if bicycle is selected, and 30 minutes if pedestrian is selected. In some embodiments, the system dynamically accounts for additional factors such as traffic, weather, accidents, road conditions, toll roads, one-way streets, available sidewalks, available bicycle trails, protests, and the like. In other embodiments, the system does not account for such additional factors, but rather has a set rate of speed for each of the modes of transportation.

Figure 11:
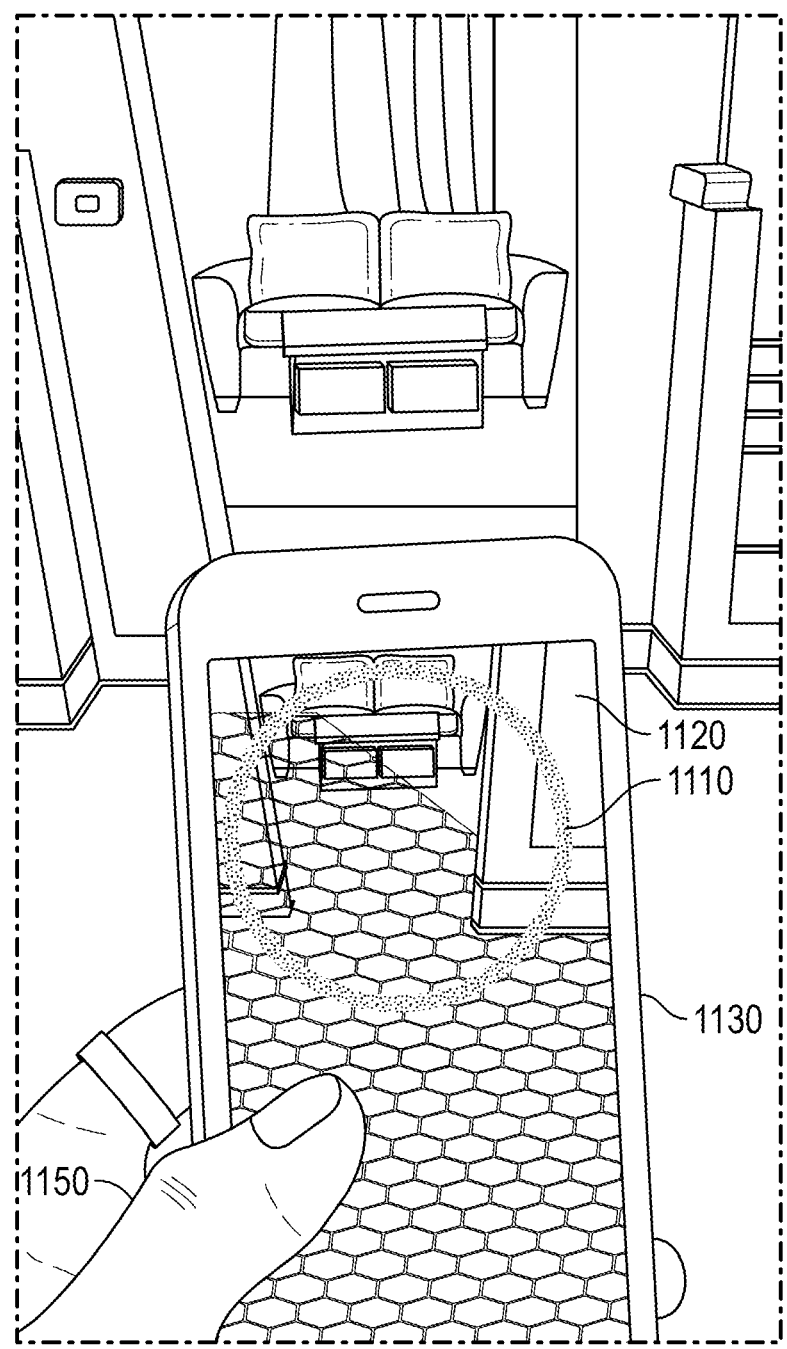
FIG. 11 illustrates a multi-dimensional fabric user interface in an augmented reality system that displays the initial formation of a portal a virtual representation of a first actual physical location through a personal mobile computing device.
Figure 12:
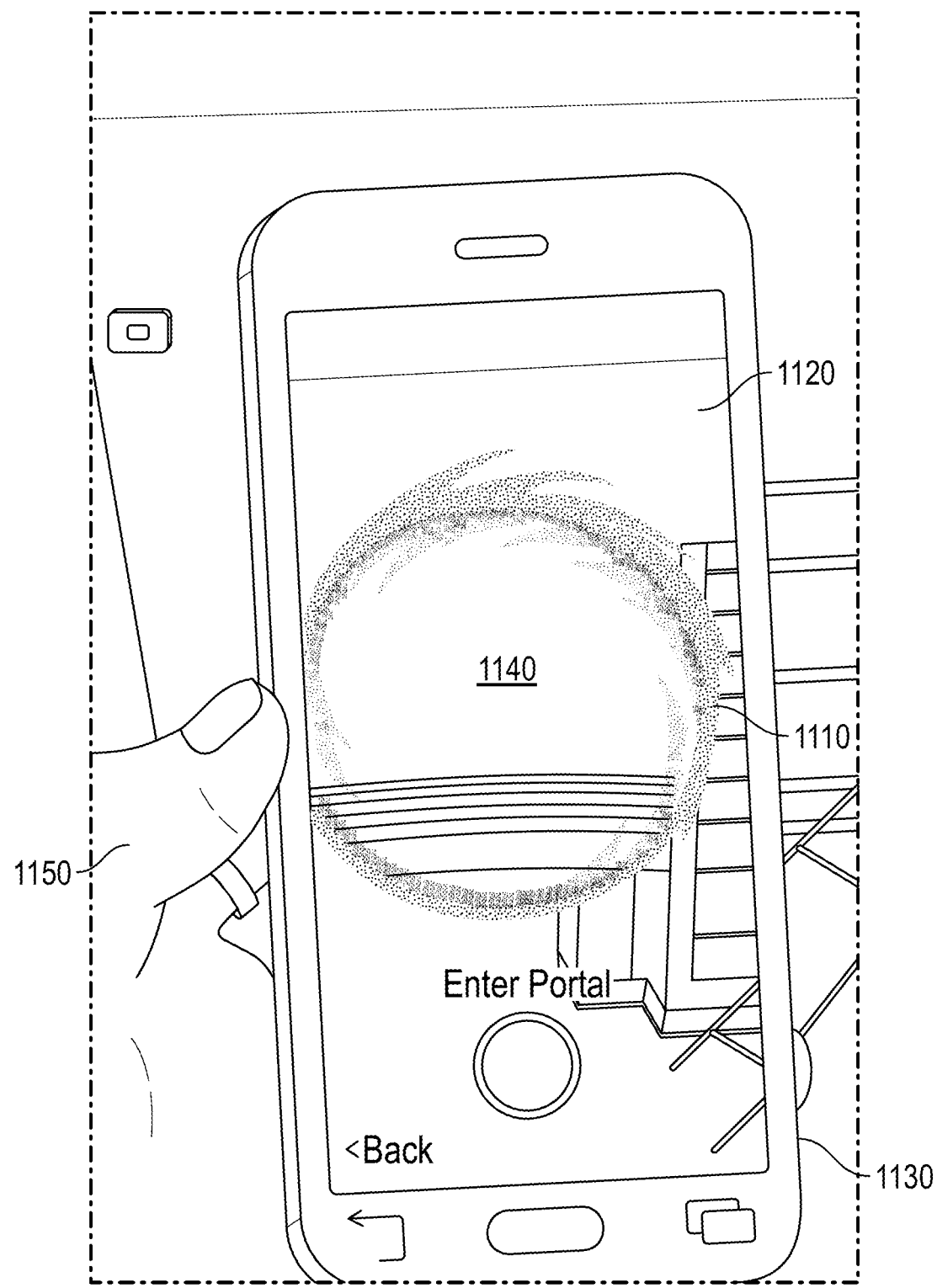
FIG. 12 illustrates a multi-dimensional fabric user interface in an augmented reality system that displays the portal in a virtual representation of the first actual physical location through the personal mobile computing device, wherein a virtual representation of a second actual physical location is viewable through the portal.

Referring now to FIGS. 11 and 12, in some embodiments of the augmented reality system for enabling enhanced functionality in a virtual environment, the remote server 102

(shown in FIG. 1) enables the user to create a portal 1110. Specifically, in one or more such embodiments the user employs a personal mobile computing device 1130 through which a virtual representation of a first actual physical location 1120 may be seen. As shown in FIG. 11, the remote server 102 enables the user 1150 of the augmented reality system to form a portal 1110 in the virtual representation of the first actual physical location 1120 as viewed in a display screen of the personal mobile computing device 1130. The remote server 102 of the augmented reality system enables the user 1150 to anchor the portal 1110 to the multi-dimensional fabric user interface in the same manner that digital content is anchored to the multi-dimensional fabric user interface. For example, the portal 1110 can be anchored to a specific location and time within a multi-dimensional fabric described herein (e.g., the virtual representation of the first actual physical location 1120). In this same manner, the user 1150 may anchor the other side of the portal 1110 to another specific location and time within a multi-dimensional fabric described herein (e.g., the virtual representation of a second actual physical location 1140). Thus, the portal 1150 may be used to virtually travel in both space and time.

As shown in FIG. 12, a multi-dimensional fabric user interface in an augmented reality system displays a portal 1110 in a virtual representation of the first actual physical location 1120 through the display screen of the personal mobile computing device 1130, wherein a virtual representation of a second actual physical location 1140 is viewable through the portal 1110 once the portal 1110 is activated. Thus, the augmented reality system enables the user 1150 to look through the first location side of the portal 1110 and see the virtual representation of the second actual physical location 1140 in the multi-dimensional fabric user interface. The portal 1110 facilitates virtual travel to the virtual representation of a second actual physical location 1140 in the multi-dimensional fabric user interface. The portal 1110 has a first location side in the virtual representation of the first actual physical location 1120 and a second location side in the virtual representation of a second actual physical location 1140.

Moreover, in one or more embodiments, the augmented reality system enables the user to look through the first location side of the portal 1110, as shown in FIG. 12, and see other users (not shown) in the virtual representation of the second actual physical location 1140 in the multi-dimensional fabric user interface. These other users could get to that virtual representation of the second actual physical location 1140 in this same manner, by creating a portal and anchoring the other side of the portal 1110 to the virtual representation of the second actual physical location 1140). In some such embodiments, the augmented reality system enables the user to look through the first location side of the portal 1110 and interact with one or more of other users, virtual locations, and virtual events in the virtual representation of the second actual physical location 1140 in the multi-dimensional fabric user interface, while still remaining in the virtual representation of the first actual physical location 1110 in the multi-dimensional fabric user interface. Such interaction through the portal 1110 is similar to the action of a customer interacting with a vender through a service window. These interactions include by way of example only, and not by way of limitation: uploading data, downloading data, posting data, live streaming data, purchasing a product or service, selling a product of service, anchoring digital content to the multi-dimensional fabric, and modifying previously anchored digital content on the multi-dimensional fabric.

Figure 13:
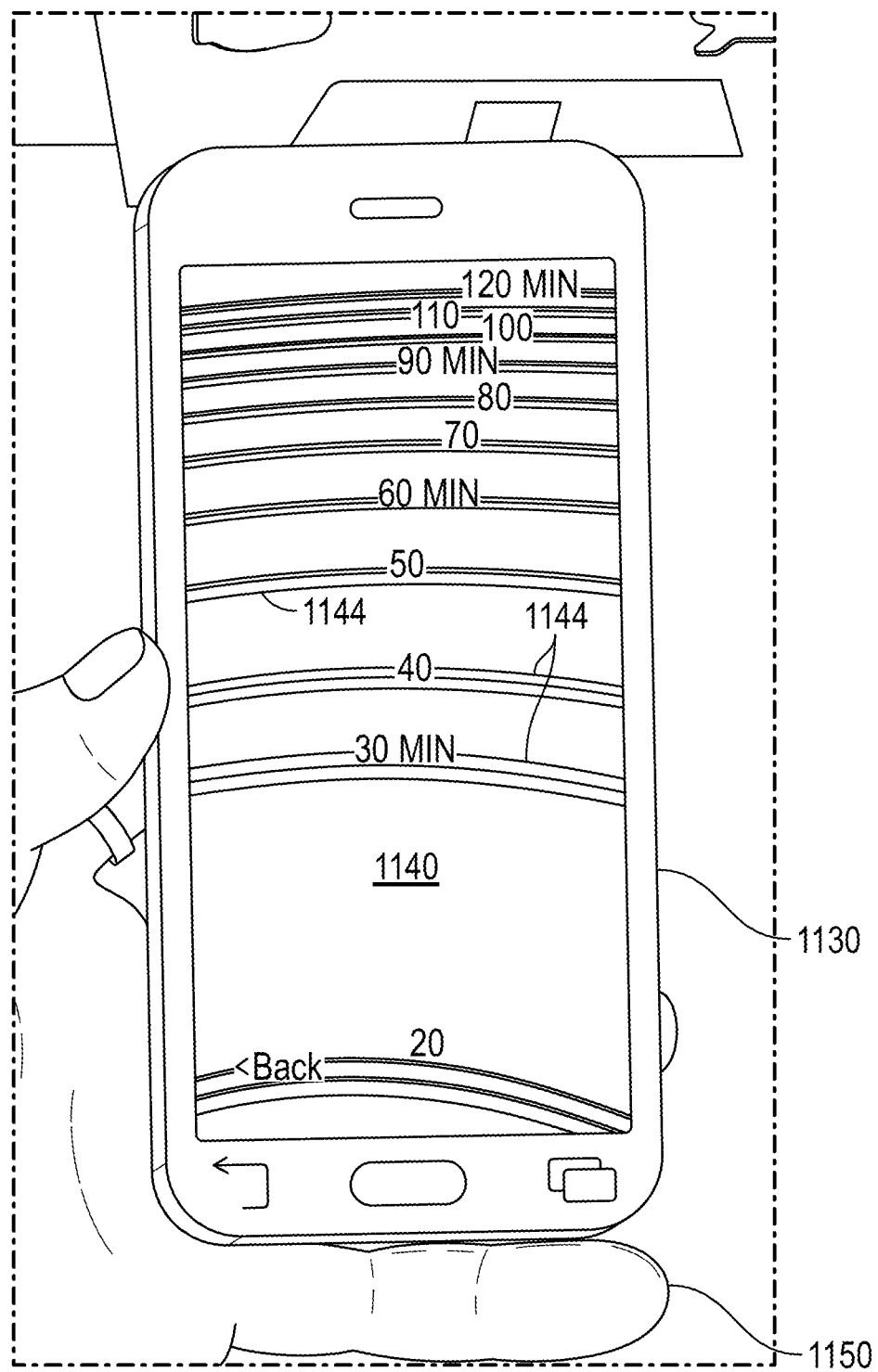
FIG. 13 illustrates a multi-dimensional fabric user interface in an augmented reality system that displays the virtual representation of the second actual physical location through the personal mobile computing device after the user walks through the portal.

Referring now to FIG. 13, the user 1150 has now stepped into the portal 1110 shown in FIG. 12, and has been transported to the second actual physical location 1140 where time distance rings 1444 may be seen. In some embodiments of the augmented reality system, the remote server 102 enables the user 1150 to enter the first location side of the portal 1110 and virtually travel to the virtual representation the second actual physical location 1140 in the multi-dimensional fabric user interface. While the user 1150 is in the multi-dimensional fabric user interface that virtually represents a second actual physical location 1140, the augmented reality system enables the user to interact with virtual objects in the virtual representation of the second actual physical location 1140. In some embodiments, the virtual objects are selected based on their storage location and time in the multi-dimensional fabric and the corresponding location and time of the virtual representation of the second actual physical location 1140. Additionally, the augmented reality system also enables the user to interact with other users in the virtual representation of the second actual physical location 1140. Again, such interactions include by way of example only, and not by way of limitation: uploading data, downloading data, posting data, live streaming data, purchasing a product or service, selling a product of service, anchoring digital content to the multi-dimensional fabric, and modifying previously anchored digital content on the multi-dimensional fabric.

In some embodiments, the virtual representation of the second actual physical location 1140 includes the time distance rings 1444 described above in FIG. 10. These time distance rings 1144 may be referred to as time ring zones. In one aspect of some such embodiments, each step that the user 1150 takes, moves the user in the time ring zones. In this manner, a user 1150 can explore digital content around a large virtual area by physically walking while holding the user's personal mobile computing device 1130.

In one or more various embodiments, the time ring zones may be selected to represent any preset granularity of time, distance, or other unit of measure. For example, in one embodiment of the augmented reality system, each step taken by the user 1150 while carrying the personal mobile computing device 1130 may translate into minutes of walking in the second actual physical location 1140. In another embodiment of the augmented reality system, each step taken by the user 1150 while carrying the personal mobile computing device 1130 may translate into days of walking in the second actual physical location 1140. In still another embodiment of the augmented reality system (e.g., a space-based virtual environment), each step taken by the user 1150 while carrying the personal mobile computing device 1130 may translate into light years of travel in the second actual physical location 1140.

In another aspect of the augmented reality system, once the user 1150 is inside the portal 1110, the user may use "pinch" and "zoom" gesturing with two or more fingers interfacing with the screen of the personal mobile computing device 1130 to bring digital content closer to them (e.g., pinching) or further from them (e.g., zooming). In still another embodiment, a user 1150 may upload any augmented reality scenery into the multi-dimensional fabric user interface that is desired (e.g., a third actual physical location, a fourth actual physical location, fifth actual physical location, a space based theoretical physical location, a past actual physical location that no longer exists, an anticipated future physical location that has not yet been built, and the like).

Figure 14:
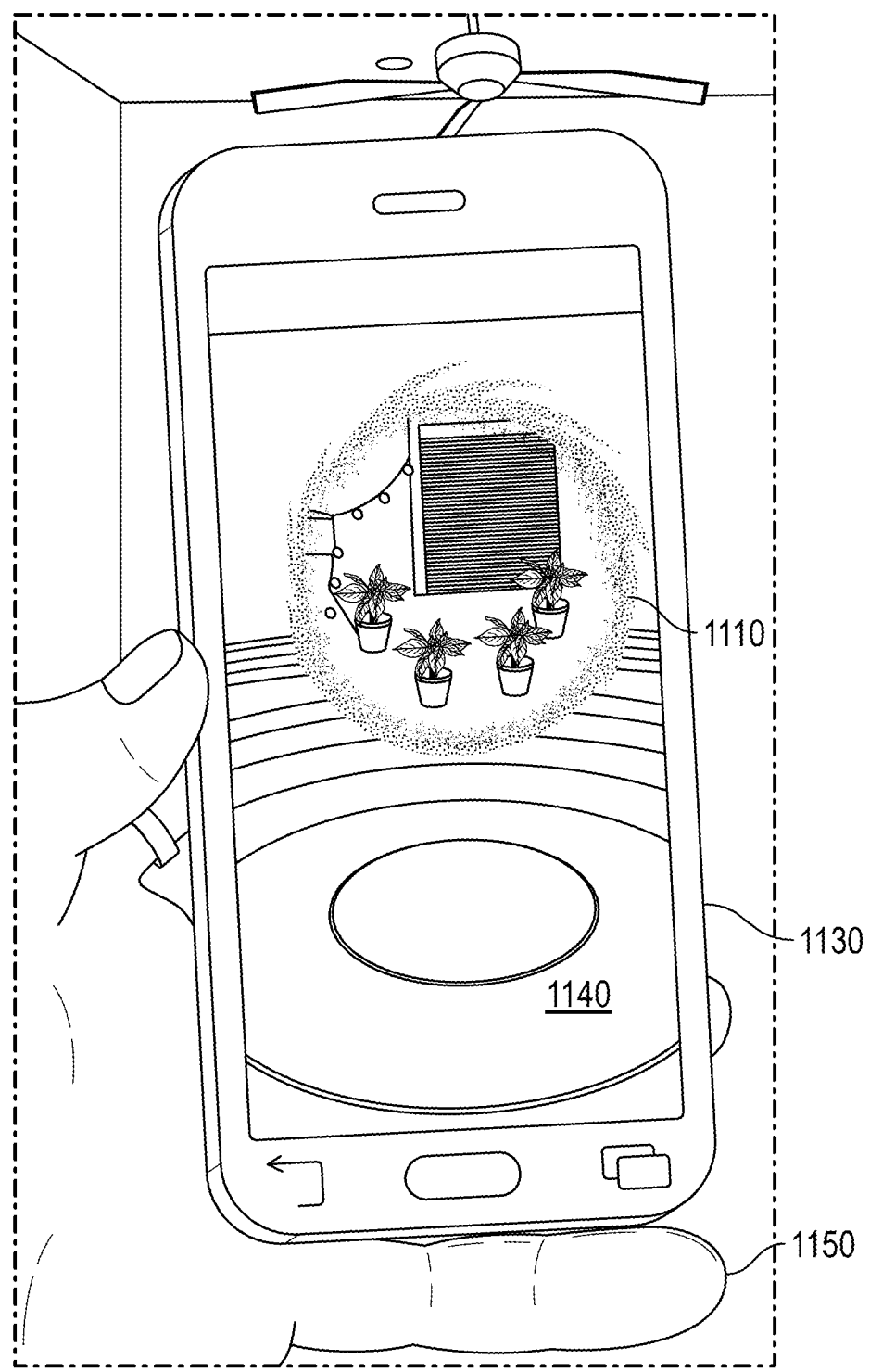
FIG. 14 illustrates a multi-dimensional fabric user interface in an augmented reality system that displays the portal in the virtual representation of the second actual physical location through the personal mobile computing device, wherein the virtual representation of the first actual physical location is viewable through the portal.

Referring now to FIG. 14, in some embodiments of the augmented reality system, while the user 1150 is in the virtual representation of the second actual physical location 1140, the user 1150 may view the portal 1110 in the display screen of the personal mobile computing device 1130 and see the virtual representation of the first actual physical location 1120 through the portal 1110. As discussed with respect to the other side of the portal 1110, the augmented reality system enables the user to look through the second location side of the portal 1110, as shown in FIG. 14, and see other users (not shown) in the virtual representation of the first actual physical location 1140 in the multi-dimensional fabric user interface. In some such embodiments, the augmented reality system enables the user to look through the second location side of the portal 1110 and interact with one or more of other users, virtual locations, and virtual events in the virtual representation of the first actual physical location 1140 in the multi-dimensional fabric user interface, while still remaining in the virtual representation of second first actual physical location 1110 in the multi-dimensional fabric user interface. As described above, these interactions include by way of example only, and not by way of limitation: uploading data, downloading data, posting data, live streaming data, purchasing a product or service, selling a product of service, anchoring digital content to the multi-dimensional fabric, and modifying previously anchored digital content on the multi-dimensional fabric.

Figure 15:
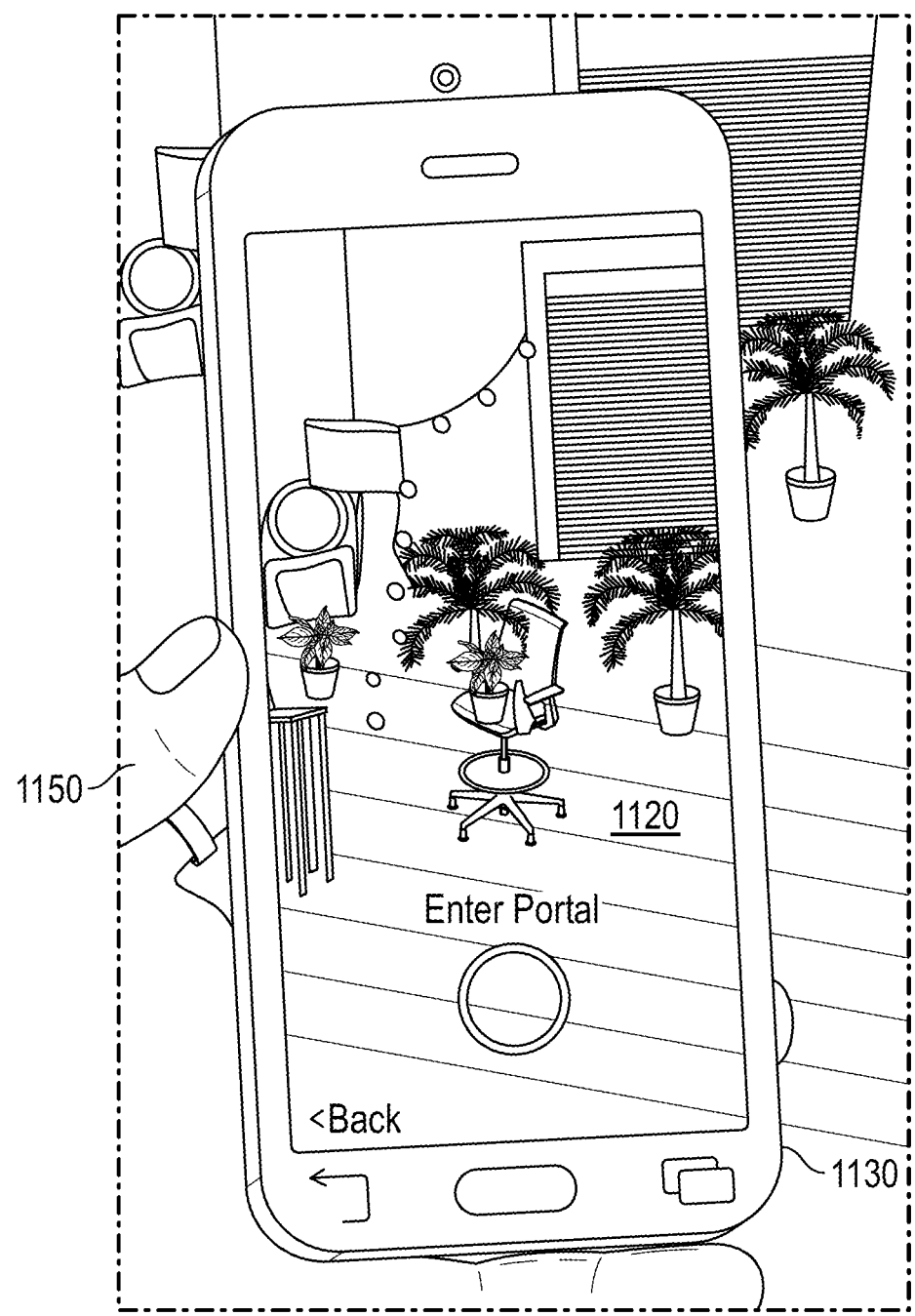
FIG. 15 illustrates a multi-dimensional fabric user interface in an augmented reality system that displays the virtual representation of the first actual physical location through the personal mobile computing device after the user walks back through the portal.

Finally, in some embodiments shown in FIG. 15, the augmented reality system enables the user to enter the second location side of the portal 1110 and virtually travel back to the virtual representation of the first actual physical location 1120 in the multi-dimensional fabric user interface, as shown through the display screen of the user's personal mobile computing device 1130.

In another aspect of some embodiments, the augmented reality system enables the user 1150 to create a portal 1110 in the virtual representation of the first actual physical location 1120 at a first date and time that facilitates virtual travel to a virtual representation of a second actual physical location 1140 at a second date and time in the multi-dimensional fabric user interface. In some embodiments, the second date and time at the second actual physical location 1140 is in the past compared to the first date and time at the first actual physical location 1120. In other embodiments, the second date and time at the second actual physical location 1140 is in the future compared to the first date and time at the first actual physical location 1120. Continuing, the augmented reality system enables the user 1150 to enter the first location side of the portal 1110 and virtually travel to the virtual representation the second actual physical location 1140 at the second date and time in the multi-dimensional fabric user interface from the virtual representation of the first actual physical location 1120 at the first date and time in the multi-dimensional fabric user interface. Significantly, the augmented reality system enables the user 1150 to interact with virtual objects in the virtual representation of the second actual physical location 1140 that existed there at the second date and time, whether that second date and time be in the future or the past. For example, the second actual physical location 1140 that existed at the second date and time in the past could be a historical site that was turn down and is no longer there. In another example, the second actual physical location 1140 that will exist at the second date and time in the future could be building that is planned by is not yet complete, or a concert that will be performed at a known date and time in the future. In another aspect of some embodiments, the augmented reality system enables the user 1150 to interact with other users at the virtual representation of the second actual physical location 1140 at the second date and time to execute one or more of the following actions: upload data, download data, post data, and live stream data.

Figure 16:
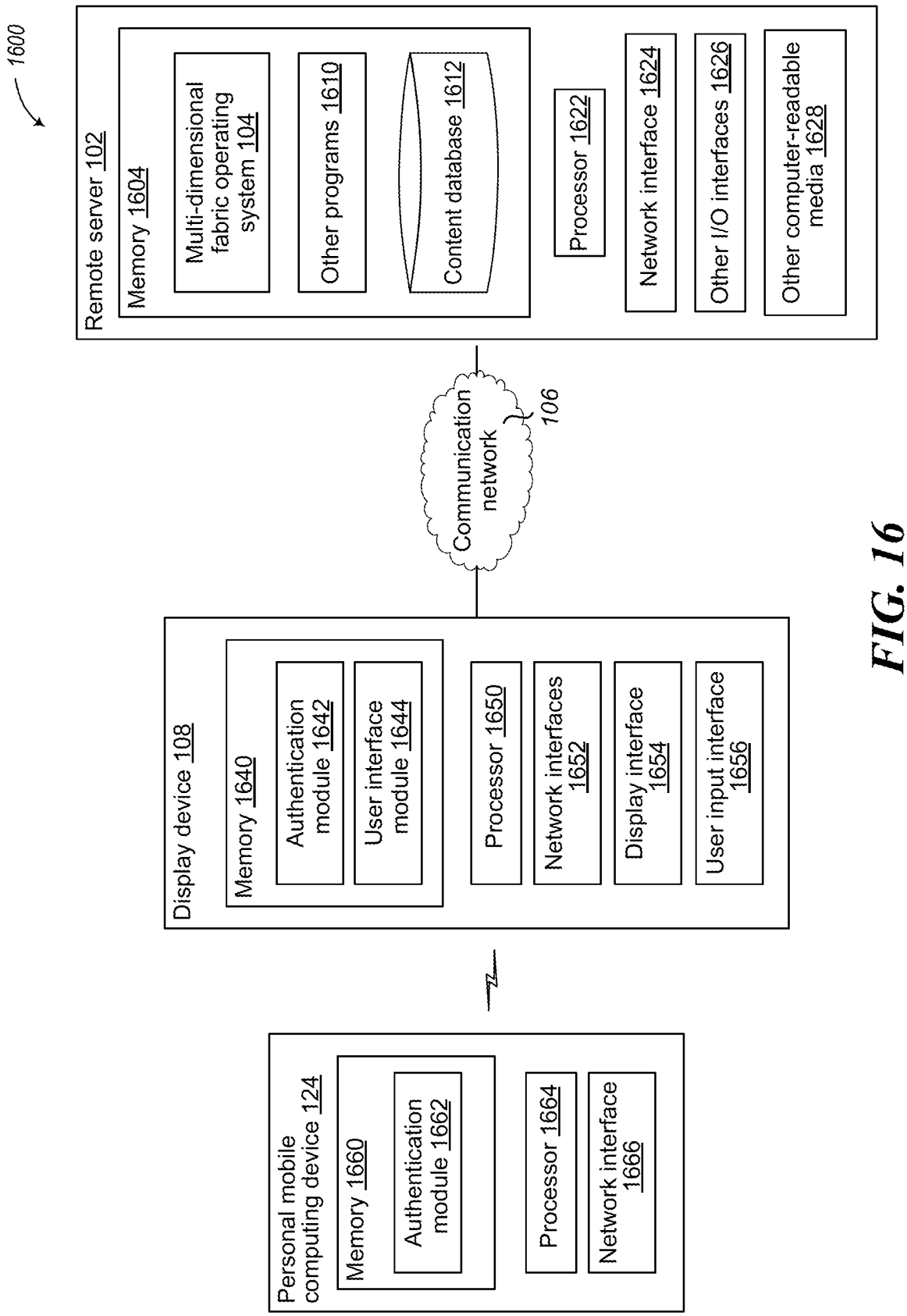
FIG. 16 illustrates a system diagram that describes one implementation of computing systems for implementing embodiments described herein.

FIG. 16 shows a system diagram that describes one implementation of computing systems for implementing embodiments described herein. System 600 includes remote server 102, one or more display devices 108, and one or more personal mobile computing devices 124.

As described herein, the remote server 102 is a computing device that can perform functionality described herein for implementing an operating system that provides a multi-dimensional fabric user interface for storing content. One or more special purpose computing systems may be used to implement the remote server 102. Accordingly, various embodiments described herein may be implemented in software, hardware, firmware, or in some combination thereof. The remote server 102 includes memory 1604, one or more processors 1622, network interface 1624, other input/output (I/O) interfaces 1626, and other computer-readable media 1628. In some embodiments, the remote server 102 may be implemented by cloud computing resources.

Processor 1622 includes one or more processing devices that execute computer instructions to perform actions, including at least some embodiments described herein. In various embodiments, the processor 1622 may include one or more central processing units ("CPU"), programmable logic, or other processing circuitry.

Memory 1604 may include one or more various types of non-volatile and/or volatile storage technologies. Examples of memory 1604 include, but are not limited to, flash memory, hard disk drives, optical drives, solid-state drives, various types of random-access memory ("RAM"), various types of read-only memory ("ROM"), other computer-readable storage media (also referred to as processor-readable storage media), or other memory technologies, or any combination thereof. Memory 1604 may be utilized to store information, including computer-readable instructions that are utilized by processor 1622 to perform actions, including at least some embodiments described herein.

Memory 1604 may have stored thereon multi-dimensional fabric operating system 104. The multi-dimensional fabric operating system 104 authenticates users of personal mobile computing devices 124 via display devices 108 and provides a user interface of a multi-dimensional fabric for storing and accessing content, as described herein.

Memory 1604 may include a content database 1612 for storing content in accordance with the multi-dimensional fabric user interface. Memory 1604 may also store other programs 1610. The other programs 510 may include other operating systems, user applications, or other computer programs that are accessible to the personal mobile computing device 124 via the display device 108.

Network interface 1624 is configured to communicate with other computing devices, such as the display devices 108, via a communication network 106. Network interface 1624 includes transmitters and receivers (not illustrated) to send and receive data associated with the multi-dimensional fabric user interface described herein.

Other I/O interfaces 1626 may include interfaces for various other input or output devices, such as audio interfaces, other video interfaces, USB interfaces, physical buttons, keyboards, haptic interfaces, tactile interfaces, or the like. Other computer-readable media 1628 may include other types of stationary or removable computer-readable media, such as removable flash drives, external hard drives, or the like.

The display devices 108 are computing devices that are remote from the remote server 102. In some embodiments, the display devices 108 may include one or more computing devices and display devices. The display devices 108 coordinate authentication between the personal mobile computing devices 124 and the remote server 102. The display devices 108 receive input from the users of the personal mobile computing device 124 and provide the input to the remote server 102. The display devices 108 receive the graphical user interfaces for the multi-dimensional fabric user interface to be presented to the users of the personal mobile computing devices 124.

One or more special-purpose computing systems may be used to implement the display devices 108. Accordingly, various embodiments described herein may be implemented in software, hardware, firmware, or in some combination thereof.

The display devices 108 include memory 1640, one or more processors 1650, network interface 1652, display interface 1654, and user input interface 1656. The memory 1640, processor 1650, and network interface 1652 may be similar to, include similar components, or incorporate embodiments of memory 1604, processor 1622, and network interface 1624 of remote server 102, respectively. Thus, processor 1650 includes one or more processing devices that execute computer instructions to perform actions, including at least some embodiments described herein. In various embodiments, the processor 1650 may include one or more CPUs, programmable logic, or other processing circuitry. The network interfaces 1652 is also configured to communicate with the personal mobile computing devices 124, such as via Bluetooth or other short-range communication protocol or technology.

Memory 1640 may include one or more various types of non-volatile and/or volatile storage technologies. Memory 1640 may be utilized to store information, including computer-readable instructions that are utilized by processor 1650 to perform actions, including at least some embodiments described herein. Memory 1640 may store various modules or programs, including authentication module 1642 and user interface module 1644. The authentication module 1642 may perform actions that coordinate the authentication between the personal mobile computing devices 124 and the remote server 102. The user interface module 1644 receives graphical user interface data from the remote server 102 for display or presentation, via the display interface 1654, to the user of the personal mobile computing devices 124. The user interface module 1644 also receives user input via the user input interface 1656 and provides that input back to the remote server 102. In various embodiments, one or more capacitative, radar, infrared, LIDAR, or other type of gesture capturing sensors may be used to receive the user input. In some other embodiments, the user interface module 1644 may receive user inputs via other input mechanisms, such as a mouse, stylus, voice-recognition, or other input sensors. Memory 1640 may also store other programs.

The personal mobile computing devices 124 are computing devices that are remote from the display devices 108 and the remote server 102. When a personal mobile computing device 124 is within a threshold range of the display device 108 or when a user of the personal mobile computing device 124 activates authentication, the personal mobile computing device 124 provides authentication data or information to the display device 108 for forwarding to the remote server 102. In various embodiments, the personal mobile computing device 124 is separate from the display device 108, such that a user can walk up to a display device 108 with the personal mobile computing device 124 to initiate the process described herein to have the display device 108 present the user interface of the multi-dimensional fabric received from the remote server 102. The user can then provide input to the display device 108, such as with hand gestures or arm movement, to manipulate the multi-dimensional fabric user interface and select content for display.

One or more special-purpose computing systems may be used to implement the personal mobile computing devices 124. Accordingly, various embodiments described herein may be implemented in software, hardware, firmware, or in some combination thereof.

The personal mobile computing devices 124 include memory 1660, one or more processors 1664, and a network interface 1666. The memory 1660, processor 1664, and network interface 1666 may be similar to, include similar components, or incorporate embodiments of memory 1640, processor 1650, and network interfaces 1652 of display devices 108, respectively. Thus, processor 1664 includes one or more processing devices that execute computer instructions to perform actions, including at least some embodiments described herein. In various embodiments, the processor 1664 may include one or more CPUs, programmable logic, or other processing circuitry. The network interface 1666 is configured to communicate with the display devices 108, but not with the remote server 102.

Memory 1660 may include one or more various types of non-volatile and/or volatile storage technologies. Memory 1660 may be utilized to store information, including computer-readable instructions that are utilized by processor 1666 to perform actions, including at least some embodiments described herein. Memory 1660 may store various modules or programs, including authentication module 1662. The authentication module 1662 may perform actions to communicate authentication information to a display device 108 when within a threshold distance from the display device or when activated by a user.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. An augmented reality system for enabling enhanced functionality in an environment, the system comprising:
 a personal mobile computing device that stores authentication information, the personal mobile computing device including a device memory that stores device computer instructions and a device processor that when executing the device computer instructions causes the personal mobile computing device to:
  coordinate authentication between the personal mobile computing device and a remote server;
  display a multi-dimensional fabric user interface in an Augmented Reality virtual environment that represents a first actual physical location to the user of the personal mobile computing device based on valid authentication of the personal mobile computing device; and receive input from the user; and the remote server includes a server memory that stores server computer instructions and a server processor that when executing the server computer instructions causes the remote server to:

select the multi-dimensional fabric user interface that is specific for the user based on the valid authentication of the personal mobile computing device;

manipulate the multi-dimensional fabric user interface to the user based on received input from the user via the associated personal mobile computing device;

enable the user to create a portal in the virtual representation of the first actual physical location that facilitates travel to a virtual representation of a second actual physical location in the multi-dimensional fabric user interface, the portal having a first location side and a second location side;

enable the user to enter the first location side of the portal and travel to the virtual representation of the second actual physical location in the multi-dimensional fabric user interface from the virtual representation of the first actual physical location in the multi-dimensional fabric user interface;

enable the user to look through the first location side of the portal on the personal mobile device and interact with one or more of other users, virtual locations, and virtual events in the virtual representation of the second actual physical location in the multi-dimensional fabric user interface from the virtual representation of the first actual physical location in the multi-dimensional fabric user interface; and while in the multi-dimensional fabric user interface that virtually represents the second actual physical location, enable the user to interact with virtual objects in the virtual representation of the second actual physical location and other users at the virtual representation of the second actual physical location to execute one or more of the following actions: upload data, download data, post data, and live stream data.

2. The system of claim 1, wherein the remote server when executing the server computer instructions further causes the remote server to:

enable the user to look through the first location side of the portal on the personal mobile device and see the virtual representation of the second actual physical location in the multi-dimensional fabric user interface from the virtual representation of the first actual physical location in the multi-dimensional fabric user interface.

3. The system of claim 1, wherein the remote server when executing the server computer instructions further causes the remote server to:

enable the user to look through the first location side of the portal on the personal mobile device and see other users in the virtual representation of the second actual physical location in the multi-dimensional fabric user interface from the virtual representation of the first actual physical location in the multi-dimensional fabric user interface.

4. The system of claim 1, wherein the remote server when executing the server computer instructions further causes the remote server to:

enable the user to look through the second location side of the portal on the personal mobile device from the virtual representation of the second actual physical location in the multi-dimensional fabric user interface and see the virtual representation of the first actual physical location in the multi-dimensional fabric user interface.

5. The system of claim 1, wherein the remote server when executing the server computer instructions further causes the remote server to:

enable the user to enter the second location side of the portal on the personal mobile device from the virtual representation of the second actual physical location in the multi-dimensional fabric user interface and travel to the virtual representation of the first actual physical location in the multi-dimensional fabric user interface.

6. The system of claim 1, wherein the server processor executes further server computer instructions that further cause the remote server to:

enable filters that control sights and experiences that are visible and available to the user in the multi-dimensional fabric user interface.

7. The system of claim 1, wherein the server processor executes further server computer instructions that further cause the remote server to:

enable users with same user-selectable filters selected to have a same virtual experience in the multi-dimensional fabric user interface, and enable the users with different user-selectable filters selected to have different virtual experiences in the multi-dimensional fabric user interface.

8. The system of claim 1 wherein the environment is a virtual environment.

9. The system of claim 1 wherein the environment is a hybrid actual physical environment and a virtual environment.

10. The system of claim 1, wherein the server processor executes further server computer instructions that further cause the remote server to:

enable advertisements in the multi-dimensional fabric user interface at a specific virtual location and for a specific period of time.

11. The system of claim 1, wherein the server processor executes further server computer instructions that further cause the remote server to:

enable the user to visit a specific physical location and be anonymous without giving up its location in the multi-dimensional fabric user interface.

12. The system of claim 1, wherein distance in the system for augmented reality system is measured by travel time-distance.

13. The system of claim 12, wherein the server processor executes further server computer instructions that further cause the remote server to:

enable travel time-distance in the multi-dimensional fabric user interface to be displayed using concentric time rings radiating out from a virtual location of the user, the concentric time rings each representing a number of minutes of elapsed time.

14. The system of claim 1, wherein the manipulation of the multi-dimensional fabric user interface based on the received input from the user includes anchoring digital content to the multi-dimensional fabric user interface.

15. The system of claim 1, wherein the manipulation of the multi-dimensional fabric user interface based on the received input from the user includes anchoring digital content to a user in the multi-dimensional fabric user interface.

16. The system of claim 1, wherein one or more of uploading data and download data include purchasing a product or service, and wherein one or more of uploading data and download data include selling a product or service.

17. An augmented reality remote server system for enabling enhanced functionality in an environment, the system comprising:
- a server processor;
- a server memory that stores server computer instructions, the server processor when executing the server computer instructions causing the remote server to:
  - provide a multi-dimensional fabric user interface to a personal mobile computing device that is a virtual representation of a first actual physical location;
  - manipulate and display the multi-dimensional fabric user interface based on received input from the user via the associated personal mobile computing device;
  - enable the user to create a portal in the virtual representation of the first actual physical location that facilitates travel to a virtual representation of a second actual physical location in the multi-dimensional fabric user interface, the portal having a first location side and a second location side;
  - enable the user to enter the first location side of the portal and travel to the virtual representation of the second actual physical location in the multi-dimensional fabric user interface from the virtual representation of the first actual physical location in the multi-dimensional fabric user interface;
  - enable the user to look through the first location side of the portal on the personal mobile device and interact with one or more of other users, virtual locations, or virtual events in the virtual representation of the second actual physical location in the multi-dimensional fabric user interface from the virtual representation of the first actual physical location in the multi-dimensional fabric user interface; and
  - while in the multi-dimensional fabric user interface that virtually represents a second actual physical location, enable the user to interact with virtual objects in the virtual representation of the second actual physical location and other users at the virtual representation of the second actual physical location.

18. The system of claim 17, wherein the augmented reality remote server system when executing the server computer instructions further causes the remote server to: build the virtual representation of the second actual physical location from data that is stored by location and time in a multi-dimensional fabric.

19. An augmented reality method for enabling enhanced functionality in an environment, the method comprising:
- accessing a remote server including a server processor and a server memory that stores server computer instructions;
- providing a multi-dimensional fabric user interface to a personal mobile computing device that is a virtual representation of a first actual physical location;
- manipulating the multi-dimensional fabric user interface based on received input from the user via the associated personal mobile computing devices;
- enabling the user to create a portal in the virtual representation of the first actual physical location that facilitates travel to a virtual representation of a second actual physical location in the multi-dimensional fabric user interface, the portal having a first location side and a second location side;
- enabling the user to enter the first location side of the portal and travel to the virtual representation of the second actual physical location in the multi-dimensional fabric user interface from the virtual representation of the first actual physical location in the multi-dimensional fabric user interface;
- enabling the user to look through the first location side of the portal and interact with one or more of other users, virtual locations, and virtual events in the virtual representation of the second actual physical location in the multi-dimensional fabric user interface from the virtual representation of the first actual physical location in the multi-dimensional fabric user interface; and
- while in the multi-dimensional fabric user interface that virtually represents a second actual physical location, enabling the user to interact with virtual objects in the virtual representation of the second actual physical location and other users at the virtual representation of the second actual physical location.

20. The method of claim 19, further comprising: enabling the user to look through the first location side of the portal and see the virtual representation of the second actual physical location in the multi-dimensional fabric user interface from the virtual representation of the first actual physical location in the multi-dimensional fabric user interface.

21. The method of claim 19, further comprising: enabling the user to look through the first location side of the portal and see other users in the virtual representation of the second actual physical location in the multi-dimensional fabric user interface from the virtual representation of the first actual physical location in the multi-dimensional fabric user interface.

22. The method of claim 19, further comprising: enabling the user to look through the second location side of the portal and see the virtual representation of the first actual physical location in the multi-dimensional fabric user interface from the virtual representation of the second actual physical location in the multi-dimensional fabric user interface.

23. The method of claim 19, further comprising: enabling the user to enter the second location side of the portal and travel to the virtual representation of the first actual physical location in the multi-dimensional fabric user interface from the virtual representation of the second actual physical location in the multi-dimensional fabric user interface.

24. An augmented reality remote server system for enabling enhanced functionality in an environment, the system comprising:
- a server processor;
- a server memory that stores server computer instructions, the server processor when executing the server computer instructions causing the remote server to:
  - provide a multi-dimensional fabric user interface to a personal mobile computing device that displays a virtual representation of a first actual physical location at a first date and time;
  - manipulate and display the multi-dimensional fabric user interface based on received input from the user via the associated personal mobile computing devices; and
  - enable the user to create a portal in the virtual representation of the first actual physical location at the first date and time that facilitates virtual travel to a virtual representation of a second actual physical location at a second date and time in the multi-dimensional fabric user interface, the portal having a first location side and a second location side;
  - enable the user to enter the first location side of the portal and virtually travel to the virtual representation of the second actual physical location at the second date and time in the multi-dimensional fabric user interface from the virtual representation of the first actual physical location at the first date and time in the multi-dimensional fabric user interface;

enabling the user to look through the first location side of the portal and interact with one or more of other users, virtual locations, or virtual events in the virtual representation of the second actual physical location in the multi-dimensional fabric user interface from the virtual representation of the first actual physical location in the multi-dimensional fabric user interface; and while in the multi-dimensional fabric user interface that virtually represents a second actual physical location at the second date and time, enable the user to interact with virtual objects in the virtual representation of the second actual physical location at the second date and time, and other users at the virtual representation of the second actual physical location at the second date and time.

* * * * *